(12) United States Patent
Sindelar

(10) Patent No.: US 10,927,982 B2
(45) Date of Patent: Feb. 23, 2021

(54) TUBULAR STRUCTURES AND KNURLING SYSTEMS AND METHODS OF MANUFACTURE AND USE THEREOF

(71) Applicant: Deflecto, LLC, Indianapolis, IN (US)

(72) Inventor: Roman Sindelar, St. Catharines (CA)

(73) Assignee: Deflecto, LLC, Indianapolis, IN (US)

( * ) Notice: Subject to any disclaimer, the term of this patent is extended or adjusted under 35 U.S.C. 154(b) by 297 days.

(21) Appl. No.: 15/910,756

(22) Filed: Mar. 2, 2018

(65) Prior Publication Data

US 2018/0187800 A1 Jul. 5, 2018

Related U.S. Application Data

(62) Division of application No. 15/678,309, filed on Aug. 16, 2017, now Pat. No. 9,933,092.

(60) Provisional application No. 62/376,586, filed on Aug. 18, 2016.

(51) Int. Cl.

| | |
|---|---|
| *B21C 37/10* | (2006.01) |
| *F16L 9/17* | (2006.01) |
| *B21D 11/20* | (2006.01) |
| *B21D 39/03* | (2006.01) |
| *B21H 7/14* | (2006.01) |
| *B21D 5/01* | (2006.01) |

(52) U.S. Cl.
CPC .............. *F16L 9/17* (2013.01); *B21C 37/101* (2013.01); *B21D 5/015* (2013.01); *B21D 11/203* (2013.01); *B21D 39/03* (2013.01); *B21H 7/14* (2013.01); *B21C 37/107* (2013.01)

(58) Field of Classification Search
CPC . B21D 5/015; B21D 7/08; B21D 9/04; B21D 11/203; B21C 37/10; B21C 37/101; B21C 37/107; F16L 9/17
See application file for complete search history.

(56) References Cited

U.S. PATENT DOCUMENTS

| | | | |
|---|---|---|---|
| 1,681,880 A | 8/1928 | Schneible | |
| 2,025,924 A | * 12/1935 | Wing | .................... B21C 37/101 228/160 |
| 2,378,261 A | 6/1945 | Turney et al. | |
| 2,453,868 A | 11/1948 | Shaw, Jr. | |
| 2,736,284 A | 2/1956 | Jacokes et al. | |
| 3,372,563 A | 3/1968 | Walsh et al. | |
| 3,650,140 A | 3/1972 | Zmuda | |

(Continued)

FOREIGN PATENT DOCUMENTS

| | | |
|---|---|---|
| FR | 2617067 | 12/1988 |
| GB | 1286538 | 8/1972 |

(Continued)

*Primary Examiner* — Edward T Tolan
(74) *Attorney, Agent, or Firm* — Barnes & Thornburg LLP

(57) ABSTRACT

A method includes: bending a sheet about a mandrel such that the sheet is tubular, wherein the sheet includes a first longitudinal end portion and a second longitudinal end portion; engaging the first longitudinal end portion with the second longitudinal end portion; and passing the sheet between a first knurling wheel and a second knurling wheel such that the first knurling wheel applies a first knurling pattern to the sheet over the first longitudinal end portion and the second longitudinal end portion and the second knurling wheel applies a second knurling pattern to the sheet over the first longitudinal end portion and the second longitudinal end portion.

18 Claims, 55 Drawing Sheets

(56) References Cited

U.S. PATENT DOCUMENTS

| | | | |
|---|---|---|---|
| 3,662,575 A | 5/1972 | Zmuda | |
| 3,783,497 A | 1/1974 | Griesinger | |
| 3,918,283 A | 11/1975 | Kosch et al. | |
| 3,940,962 A | 3/1976 | Davis | |
| 4,030,331 A | 6/1977 | Keasling | |
| 4,070,887 A | 1/1978 | Hankin | |
| 4,313,329 A * | 2/1982 | Caswall, Jr. | B21C 1/27 414/745.7 |
| 4,590,779 A | 5/1986 | Stange et al. | |
| 4,796,797 A | 1/1989 | Nakako et al. | |
| 5,771,735 A | 6/1998 | Caporusso et al. | |
| 9,358,593 B1 | 6/2016 | Hopper | |
| 2004/0250404 A1* | 12/2004 | Cripsey | B21C 37/0815 29/460 |
| 2005/0005662 A1* | 1/2005 | Burger | B21D 5/015 72/51 |

FOREIGN PATENT DOCUMENTS

| | | |
|---|---|---|
| JP | 569016 | 1/1981 |
| JP | 6418524 | 1/1989 |

\* cited by examiner

TUBULAR STRUCTURES AND KNURLING SYSTEMS AND METHODS OF MANUFACTURE AND USE THEREOF

CROSS-REFERENCE TO RELATED APPLICATIONS

This application is a divisional of U.S. patent application Ser. No. 15/678,309 filed Aug. 16, 2017; which claims a benefit of priority to U.S. Patent Application Ser. No. 62/376,586, filed on Aug. 18, 2016, each of which is herein incorporated by reference for all purposes.

TECHNICAL FIELD

This disclosure relates to tubing.

BACKGROUND

In this disclosure, where a document, an act, and/or an item of knowledge is referred to and/or discussed, then such reference and/or discussion is not an admission that the document, the act, and/or the item of knowledge and/or any combination thereof was at a priority date, publicly available, known to a public, part of common general knowledge, and/or otherwise constitutes any prior art under any applicable statutory provisions; and/or is known to be relevant to any attempt to solve any problem with which this disclosure may be concerned with. Further, nothing is disclaimed.

Tubing is used for various purposes, such as for wire/cable routing or for fluid conveyance. For example, a fluid conveyance may involve a gas conveyance in a context of a heating, ventilation, and air conditioning (HVAC) tube, such as for conveying a forced air. Likewise, a fluid conveyance may involve a liquid conveyance in a context of a liquid piping tube, such as for conveying a forced water.

The tubing may be structured such that a fluid leakage may occur therefrom. Such fluid leakage may lead to various undesired outcomes. For example, the fluid leakage may lead to a change in a fluid pressure or a thermal energy in the tubing. Further, the fluid leakage may lead to a fluid exhaust from the tubing, which may be dangerous if hot or contaminated. Moreover, the fluid leakage may lead to a particle exhaust from the tubing, which may be dangerous if hot or contaminated. For example, if the tubing is used in venting a dryer, then a lint may exit the tubing, which may cause a room containing the tubing to become dirty or polluted. Further, if the dryer dries based on burning a gas, such as a natural gas, then the gas may travel within the tubing and leak from the tubing, which may cause a health hazard, especially if the gas is hot, or an explosion in the room containing the tubing. For example, if the room is a sterile room, such as for biological/medical purposes or manufacturing purposes, and the tubing exhibits the fluid leakage, then the room may become contaminated. Therefore, there is a desire to minimize the fluid leakage from the tubing.

SUMMARY

This disclosure may at least partially address at least one of above inefficiencies. However, this disclosure can prove useful to other technical areas. Therefore, various claims recited below should not be construed as necessarily limited to addressing any of the above inefficiencies.

An embodiment includes a method comprising: bending a sheet about a mandrel such that the sheet is tubular, wherein the sheet includes a first longitudinal end portion and a second longitudinal end portion; engaging the first longitudinal end portion with the second longitudinal end portion; and passing the sheet between a first knurling wheel and a second knurling wheel such that the first knurling wheel applies a first knurling pattern to the sheet over the first longitudinal end portion and the second longitudinal end portion and the second knurling wheel applies a second knurling pattern to the sheet over the first longitudinal end portion and the second longitudinal end portion.

An embodiment includes a system comprising: a mandrel; a pair of arms configured for synchronized pivoting; a first knurling wheel; and a second knurling wheel, wherein the pair of arms are configured to bend a sheet with a first longitudinal end portion and a second longitudinal end portion about the mandrel such that the sheet is tubular and such that the first longitudinal end portion can engage with the second longitudinal end portion, and wherein the first knurling wheel and the second knurling wheel are configured to receive the sheet therebetween such that the first knurling wheel applies a first knurling pattern to the sheet over the first longitudinal end portion and the second longitudinal end portion and the second knurling wheel applies a second knurling pattern to the sheet over the first longitudinal end portion and the second longitudinal end portion.

An embodiment includes a device comprising: a sheet including a first longitudinal end portion and a second longitudinal end portion, wherein the first longitudinal end portion includes a first interface, wherein the second longitudinal end portion includes a second interface, wherein the first interface engages the second interface such that the sheet is in a tubular form, wherein the sheet includes a first knurling pattern imparted thereon over the first longitudinal end portion and the second longitudinal end portion and a second knurling pattern imparted thereon over the first longitudinal end portion and the second longitudinal end portion, wherein the second knurling pattern faces the sheet in the tubular form.

This disclosure may be embodied in various forms illustrated in a set of accompanying illustrative drawings. Note that variations are contemplated as being a part of this disclosure, limited only by a scope of various claims recited below.

BRIEF DESCRIPTION OF DRAWINGS

The set of accompanying illustrative drawings shows various example embodiments of this disclosure. Such drawings are not to be construed as necessarily limiting this disclosure. Like numbers and/or similar numbering scheme can refer to like and/or similar elements throughout.

DETAILED DESCRIPTION

Figure 1:
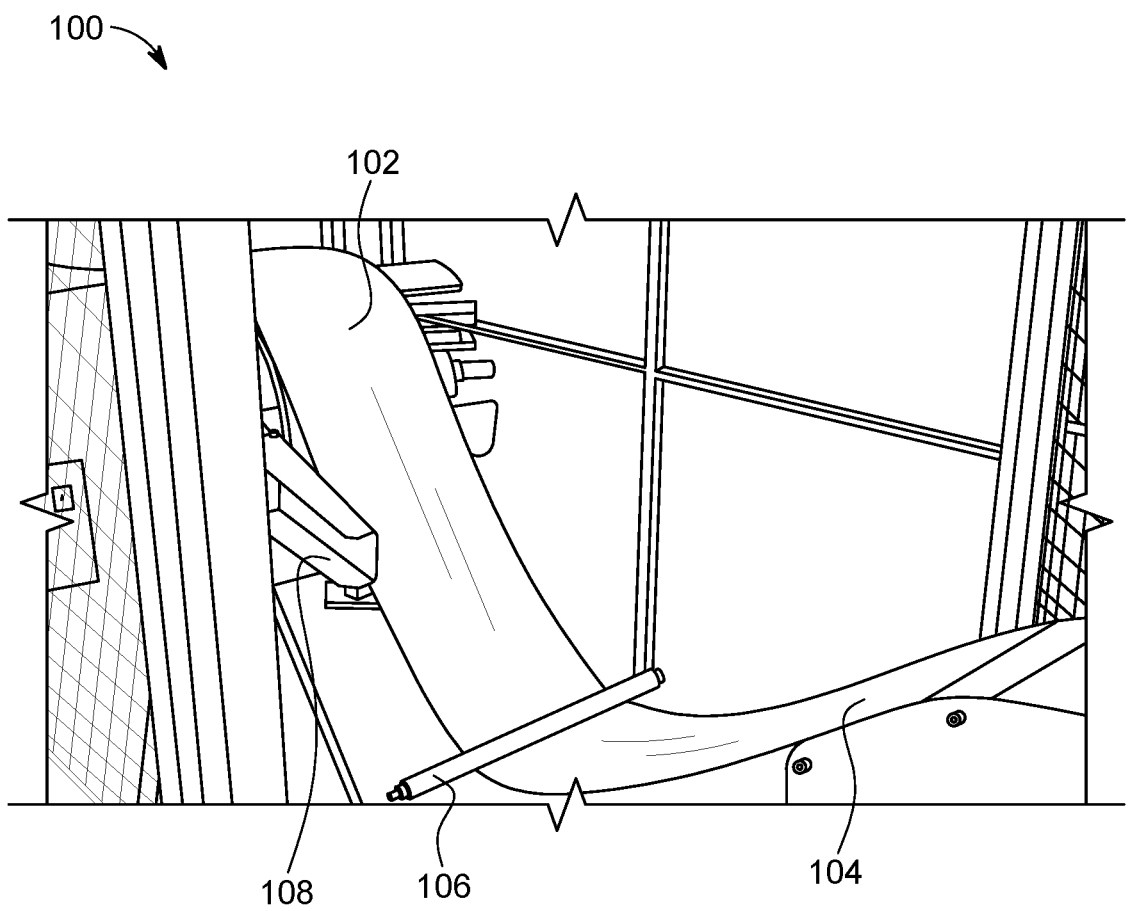
FIG. 1-FIG. 47 illustrate an embodiment of a process of manufacturing a tube according to this disclosure.

This disclosure is now described more fully with reference to the set of accompanying illustrative drawings, in which example embodiments of this disclosure are shown. This disclosure may, however, be embodied in many different forms and should not be construed as necessarily being limited to the example embodiments disclosed herein. Rather, the example embodiments are provided so that this disclosure is thorough and complete, and fully conveys various concepts of this disclosure to those skilled in a relevant art.

Features described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity in any manner.

Various terminology used herein can imply direct or indirect, full or partial, temporary or permanent, action or inaction. For example, when an element is referred to as being "on," "connected" or "coupled" to another element, then the element can be directly on, connected or coupled to the other element and/or intervening elements can be present, including indirect and/or direct variants. In contrast, when an element is referred to as being "directly connected" or "directly couple" to another element, there are no intervening elements present.

Although the terms first, second, etc. can be used herein to describe various elements, components, regions, layers and/or sections, these elements, components, regions, layers and/or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Various terminology used herein is for describing particular example embodiments and is not intended to be necessarily limiting of this disclosure. As used herein, various singular forms "a," "an" and "the" are intended to include various plural forms as well, unless a context clearly indicates otherwise. Various terms "comprises," "includes" and/or "comprising," "including" when used in this specification, specify a presence of stated features, integers, steps, operations, elements, and/or components, but do not preclude the presence and/or addition of one or more other features, integers, steps, operations, elements, components, and/or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

Example embodiments of this disclosure are described herein with reference to illustrations of idealized embodiments (and intermediate structures) of this disclosure. As such, variations from various illustrated shapes as a result, for example, of manufacturing techniques and/or tolerances, are to be expected. Thus, various example embodiments of this disclosure should not be construed as necessarily limited to various particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing, and/or other any other types of manufacturing. For example, some manufacturing processes include three dimensional (3D) printing, laser cutting, computer numerical control routing, milling, pressing, stamping, vacuum forming, hydroforming, injection molding, lithography, and so forth.

Any and/or all elements, as disclosed herein, can be and/or include, whether partially and/or fully, a solid, including a metal, a mineral, an amorphous material, a ceramic, a glass ceramic, an organic solid, such as wood and/or a polymer, such as rubber, a composite material, a semiconductor, a nanomaterial, a biomaterial and/or any combinations thereof. Any and/or all elements, as disclosed herein, can be and/or include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, opaqueness, luminescence, reflection, phosphorescence, anti-reflection and/or holography, a photo-sensitive coating, an electronic and/or thermal property coating, such as for passivity, insulation, resistance or conduction, a magnetic coating, a water-resistant and/or waterproof coating, a scent coating and/or any combinations thereof. Any and/or all elements, as disclosed herein, can be rigid, flexible, and/or any other combinations thereof. Any and/or all elements, as disclosed herein, can be identical and/or different from each other in material, shape, size, color and/or any measurable dimension, such as length, width, height, depth, area, orientation, perimeter, volume, breadth, density, temperature, resistance, and so forth.

Unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized and/or overly formal sense unless expressly so defined herein.

Furthermore, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms "below" and "lower" can encompass both an orientation of above and below.

As used herein, a term "about" and/or "substantially" refers to a +/−10% variation from a nominal value/term.

Such variation is always included in any given value/term provided herein, whether or not such variation is specifically referred thereto.

If any disclosures are incorporated herein by reference and such disclosures conflict in part and/or in whole with this disclosure, then to an extent of a conflict, if any, and/or a broader disclosure, and/or broader definition of terms, this disclosure controls. If such disclosures conflict in part and/or in whole with one another, then to an extent of a conflict, if any, a later-dated disclosure controls.

Figure 2:
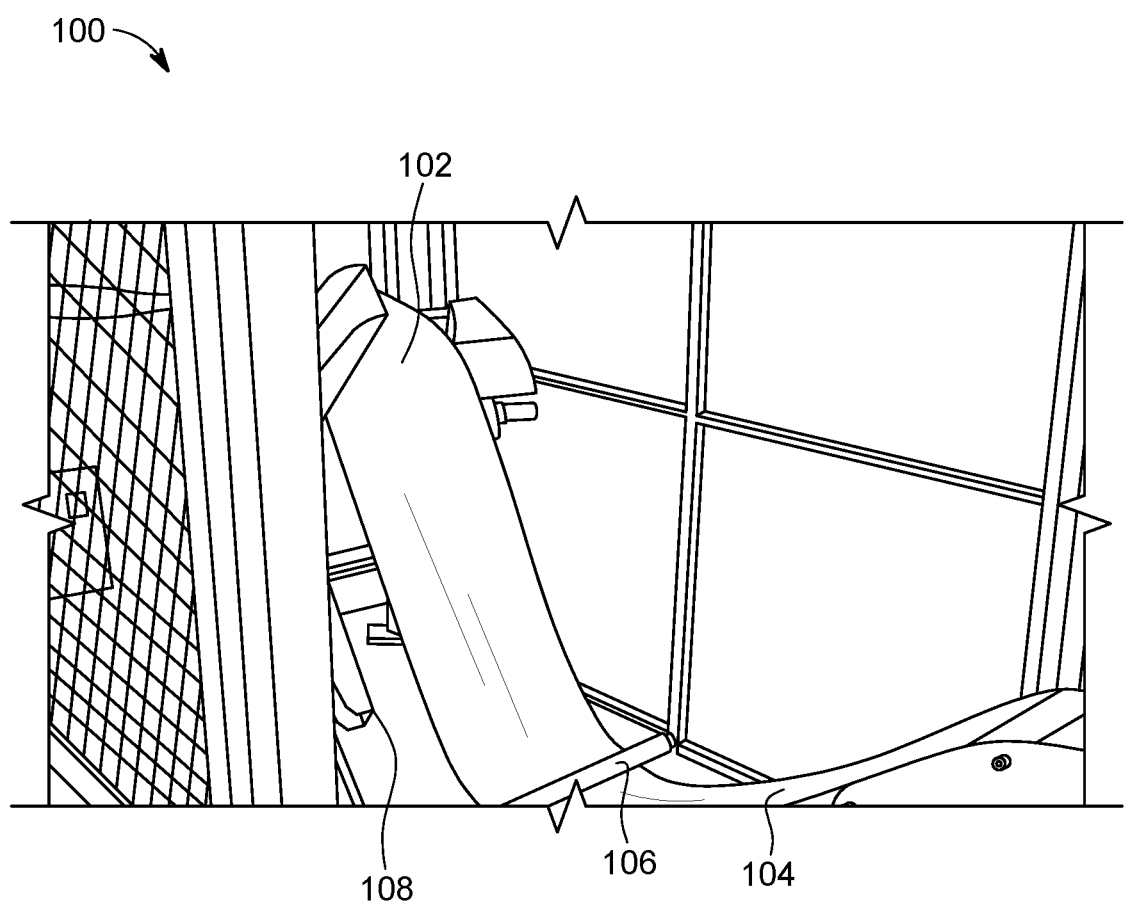

FIG. 1-FIG. 47 illustrate an embodiment of a process of manufacturing a tube according to this disclosure. Note that this process is powered, such as via electricity, thermal, solar, wind, water, fossil, or other forms of power, and automatic, such as with little or no direct human control or others, and pneumatic, such as via a compressed gas, whether inert or non-inert, a pressurized air, or other forms of fluid power, such as hydraulics or others. In particular, FIG. 1 and FIG. 2 show a manufacturing assembly 100 having a roll of metal 102 rolling a metal web 104 for downstream manufacturing of a tube. The manufacturing assembly 100 includes a tensioner roller 106 engaging the metal web 104 and a plus sign shaped assembly 108 coupled to the roll of metal 102. Note that the roll of metal 102 can be of any type, such as steel, including stainless steel or galvanized steel, aluminum, brass, copper, steel, tin, nickel, titanium, silver, gold, platinum, or any alloys thereof or any equivalent materials. Note that the roll of metal 102 can comprise a metal from about 30 gauge to about 7 gauge. For example, when the metal is at about 8 gauge or about 7 gauge, then this process involves a hydraulic equipment. For example, if the roll of metal 102 comprises a stainless steel, then the stainless steel can be of grades 304, 316, 410, or 430, although other grades can be used, in whole or in part, whether additional or alternative. For example, if the roll of metal 102 comprises an aluminum, then the aluminum can be of grade 1100-H14, 3003-H14, 5052-H32, or 6061-T6. In some embodiments, the roll 102 can include non-metals, such as plastic, rubber, fabric, or others, in whole or in part, whether opaque, transparent, translucent, reflective, non-reflective, solid, or perforated.

Figure 3:
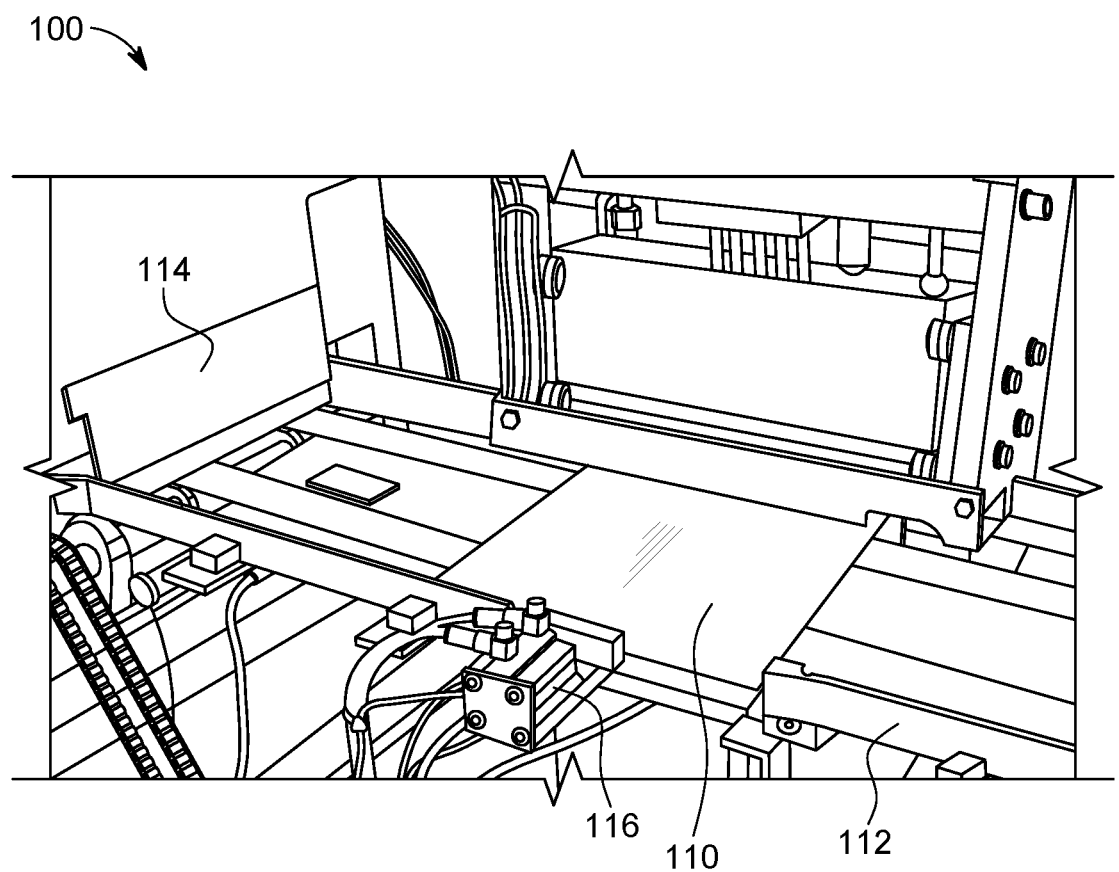

FIG. 3 shows a sheet 110 cut from the metal web 104, as sourced from the roll of metal 102, via a web cutter 114. The sheet 110, as cut via the cutter 114, is being transported on a first conveyor 112 of the manufacturing assembly 100 for downstream manufacturing of a tube. Note that although the sheet 110 is rectangular, other shapes are possible, such as square, triangular, circular, oval, trapezoidal, pentagonal, octagonal, or others. The first conveyor 112 is driven via a first motor 116. The first conveyor 112 is a belted conveyor.

Figure 4:
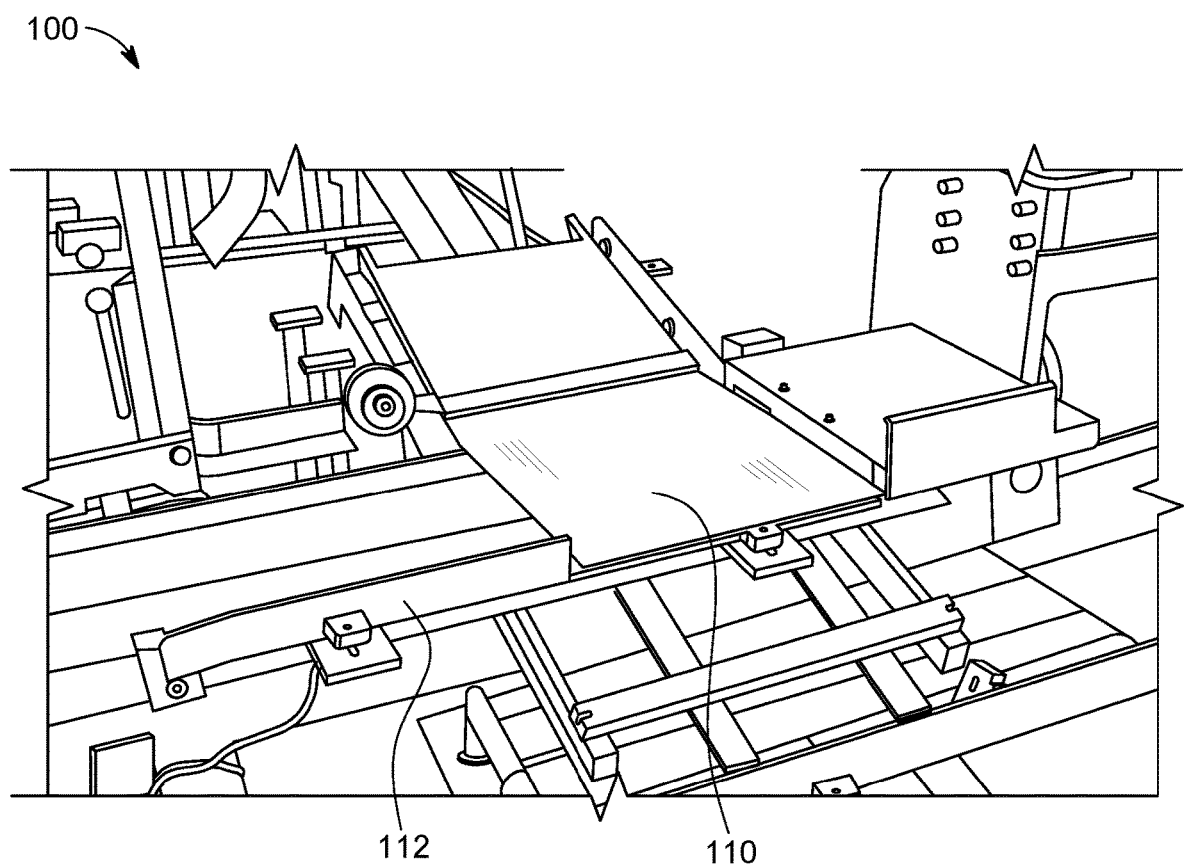
Figure 5:
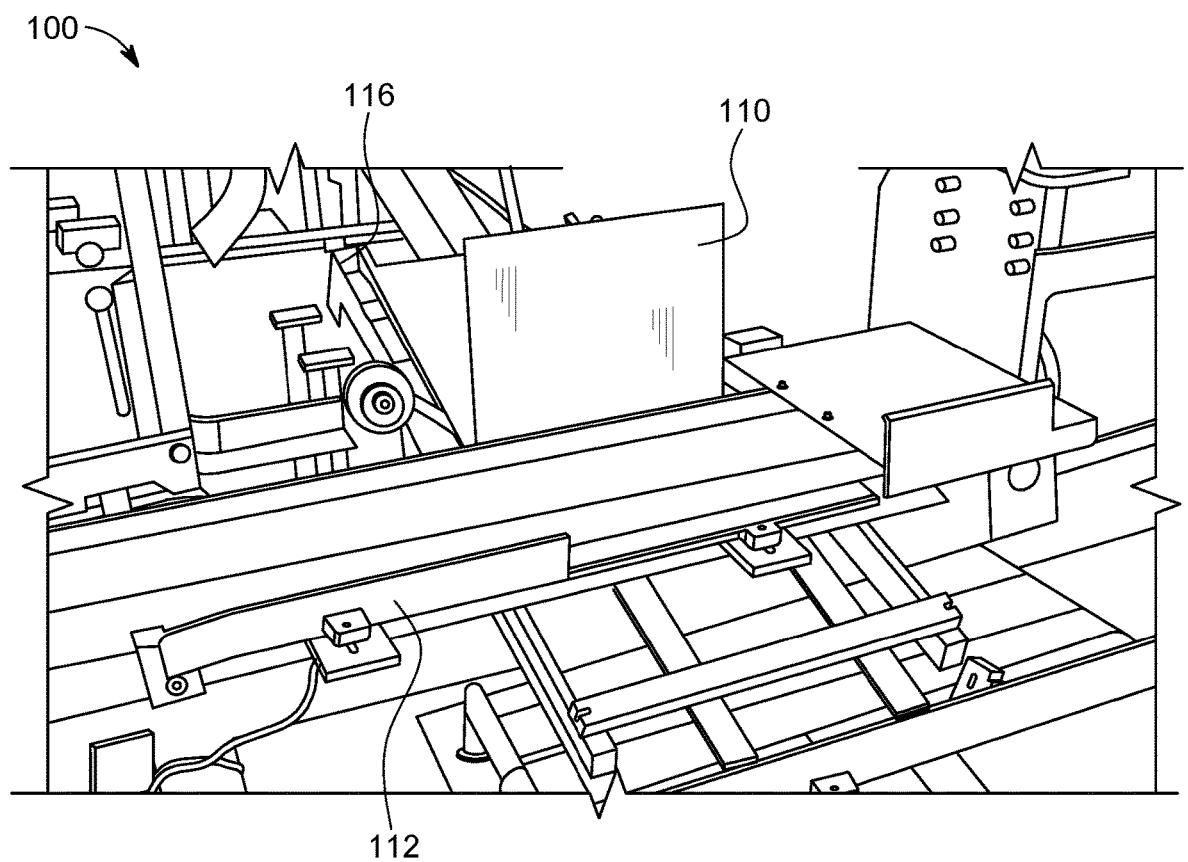
Figure 6:
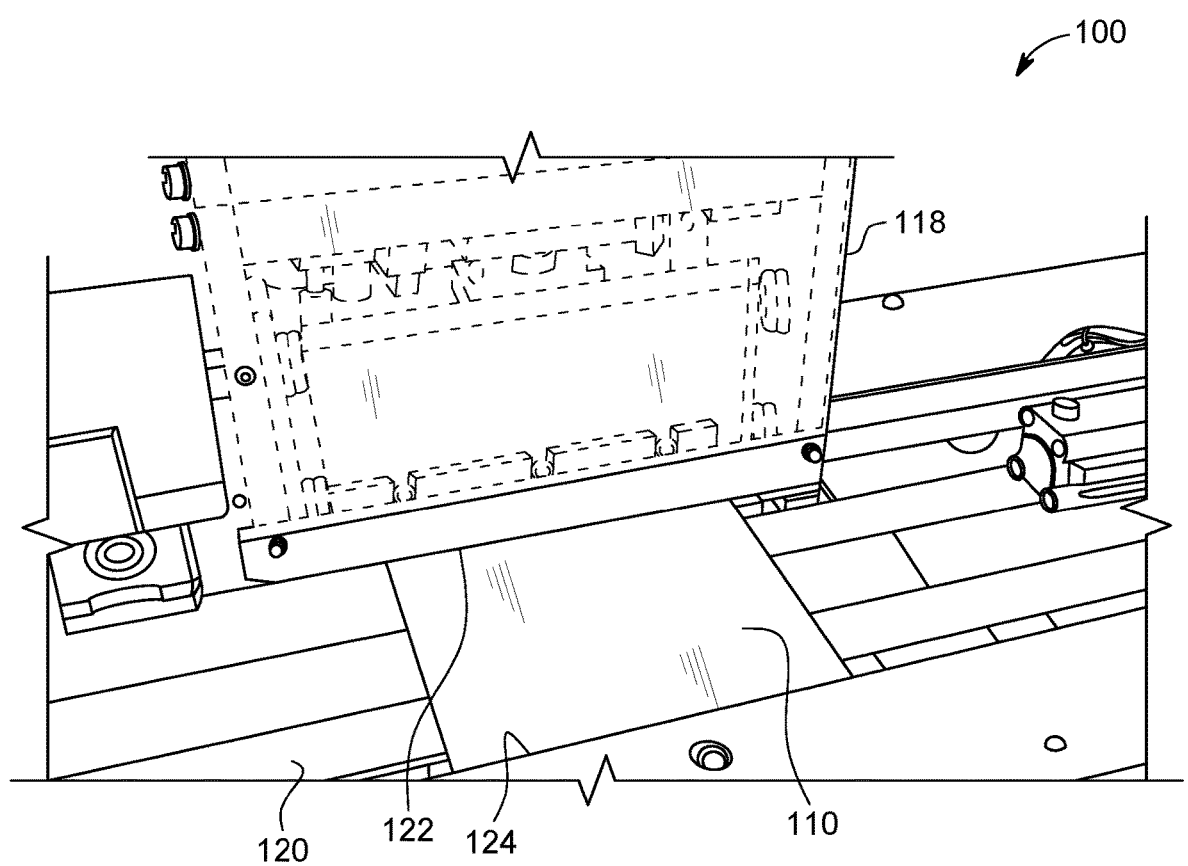

FIG. 4 and FIG. 5 show the sheet 110 being flipped from the first conveyor 112 onto a second conveyor 116 for conveyance onto a third conveyor 120, as illustrated in FIG. 6. The second conveyor 116 and the third conveyor 120 may be similar to the first conveyor 112 in structure and operation. Note that the second conveyor 116 is perpendicular to the first conveyor 112 and the third conveyor 120.

Figure 48:
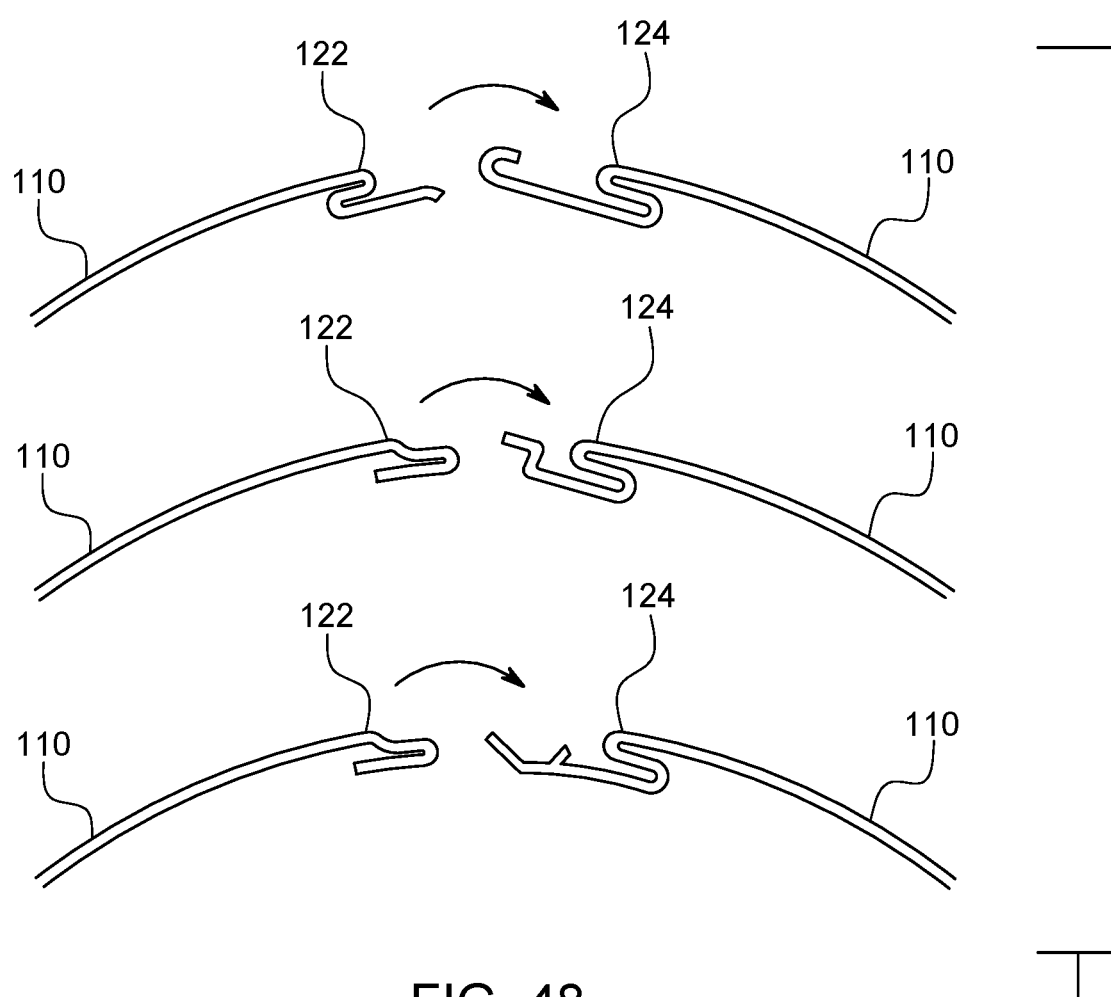
FIG. 48 shows a schematic diagram of a plurality of embodiments of various locking configurations according to this disclosure.

FIG. 6 shows a pair of opposing longitudinal end portions 122, 124 of the sheet 110 being bent in a lock forming machine or a roll forming machine, such as those manufactured via Lockformer® company or others, or a press brake 118 stationed along the third conveyor 120. Such bending can be into various locking configurations or interfaces. For example, some of such configurations or interfaces are illustrated in FIG. 48. Note that FIG. 48 shows a schematic diagram of a plurality of embodiments of various locking configurations or interfaces according to this disclosure, such as via mating or others. Further, note that such bending forms the pair of opposing longitudinal end portions into various predetermined bends by clamping the pair of opposing longitudinal end portions between a matching punch and die, such as a V-shaped die. For example, as illustrated in FIG. 48, a plurality of longitudinal end portions 122 (male) can include a J-shaped portion, an S-shaped portion, a U-shaped portion, a dip portion, a C-shaped portion, or others. For example, as illustrated in FIG. 48, a plurality of longitudinal end portions 124 (female) can include a J-shaped portion, an S-shaped portion, a U-shaped portion, a dip portion, a C-shaped portion, an L-shaped portion, or others. Note that the longitudinal portions 122 are inserted into the longitudinal portions 124 such that the longitudinal portions 124 receive the longitudinal portions 122 and snugly contain the longitudinal portions 122, thereby forming a cylindrically tubular structure, as disclosed herein. Note that the opposing longitudinal end portions 122, 124 can be configured in non-locking configurations or interfaces, such as mating, adhering, magnetizing, or others, or be non-bent, such as mating, adhering, magnetizing, or others, yet still engage with each other, such as securely, fastenably, matingly, interlockingly, or others.

Figure 7:
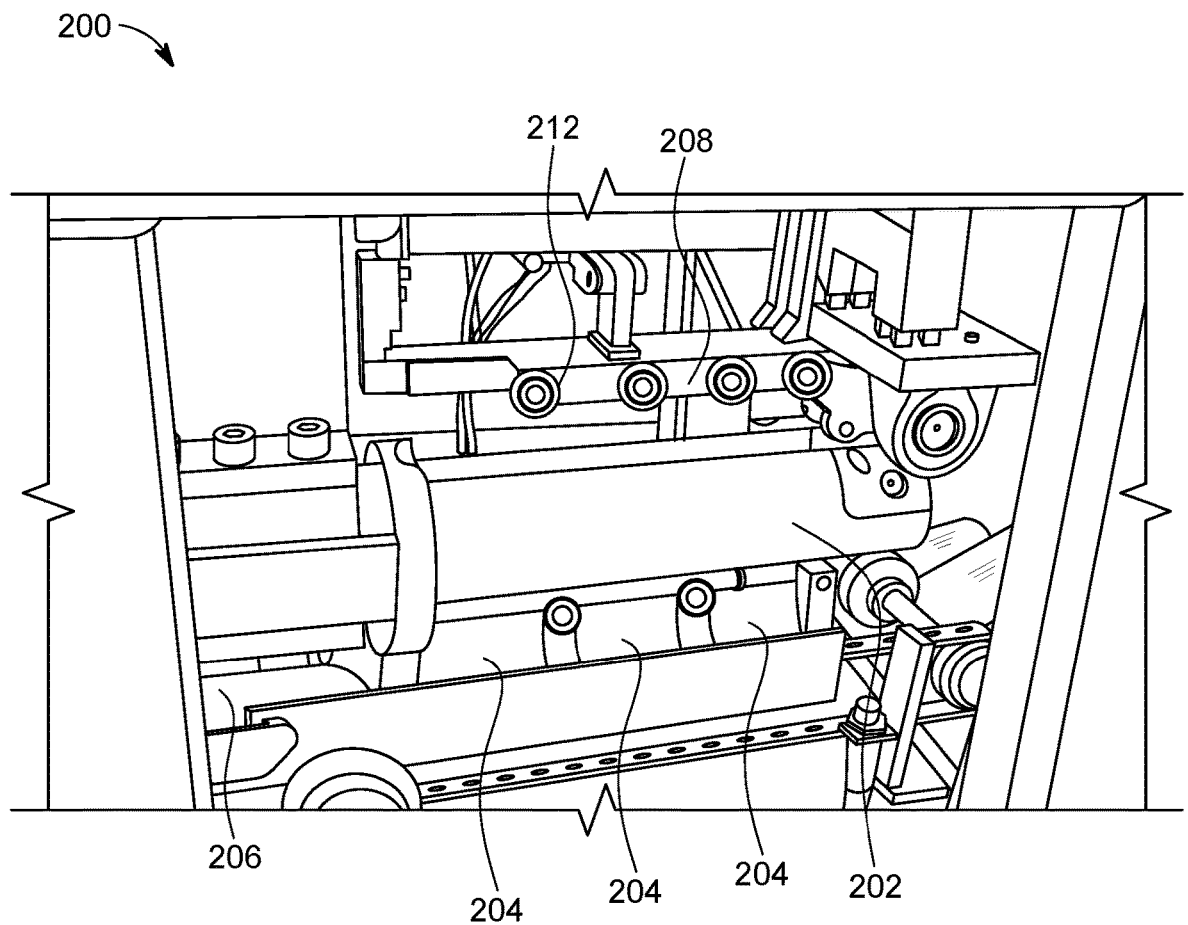

FIG. 7 shows a tube forming machine 200, such as a closing station or a seam closing machine, comprising a mandrel 202, a pair of C-shaped jaws/clamp arms 204, a fourth conveyor 206, and a wheel unit 208. The mandrel 202 is longitudinally positioned between the fourth conveyor 206 and the wheel unit 208. Although the mandrel 202 appears to be uniformly cylindrical longitudinally and circular cross-sectionally, the mandrel 202 can be structured to appear differently, such as being tapered longitudinally or oval cross-sectionally or triangular cross-sectionally or others. Although the wheel unit 208 is above the mandrel 202 and the fourth conveyor 206 is below the mandrel 202, such orientation can be reversed, where the wheel unit 208 is below the mandrel and the fourth conveyor 206 is above the mandrel, such as when the sheet 110 is coupled to the fourth conveyor 206 via various coupling methods, such as magnetism, adhering, or others, so as to prevent the sheet 110 from falling gravitationally. Note that the fourth conveyor 206 may be timing belt/chain driven.

The pair of C-shaped jaws/clamp arms 204 oppose each other, such as in a ( ) manner, and longitudinally extend along the mandrel 202 and pivot about an axis, which can be a common/single axis, longitudinally parallel to the mandrel 202. For example, at least one of the C-shaped jaws/clamp arms 204 can be pivotally coupled to a rigid shaft extending longitudinally along the mandrel 202 such that the at least one of the C-shaped jaws/clamp arms 204 can automatically pivot about the rigid shaft toward the mandrel 202 into a clamping position and away from the mandrel 202 into a non-clamping position. Note that the rigid shaft is an example and other ways of pivotally coupling the at least one of the C-shaped jaws/clamp arm 204 are possible, such as via a hinge or others.

Figure 15:
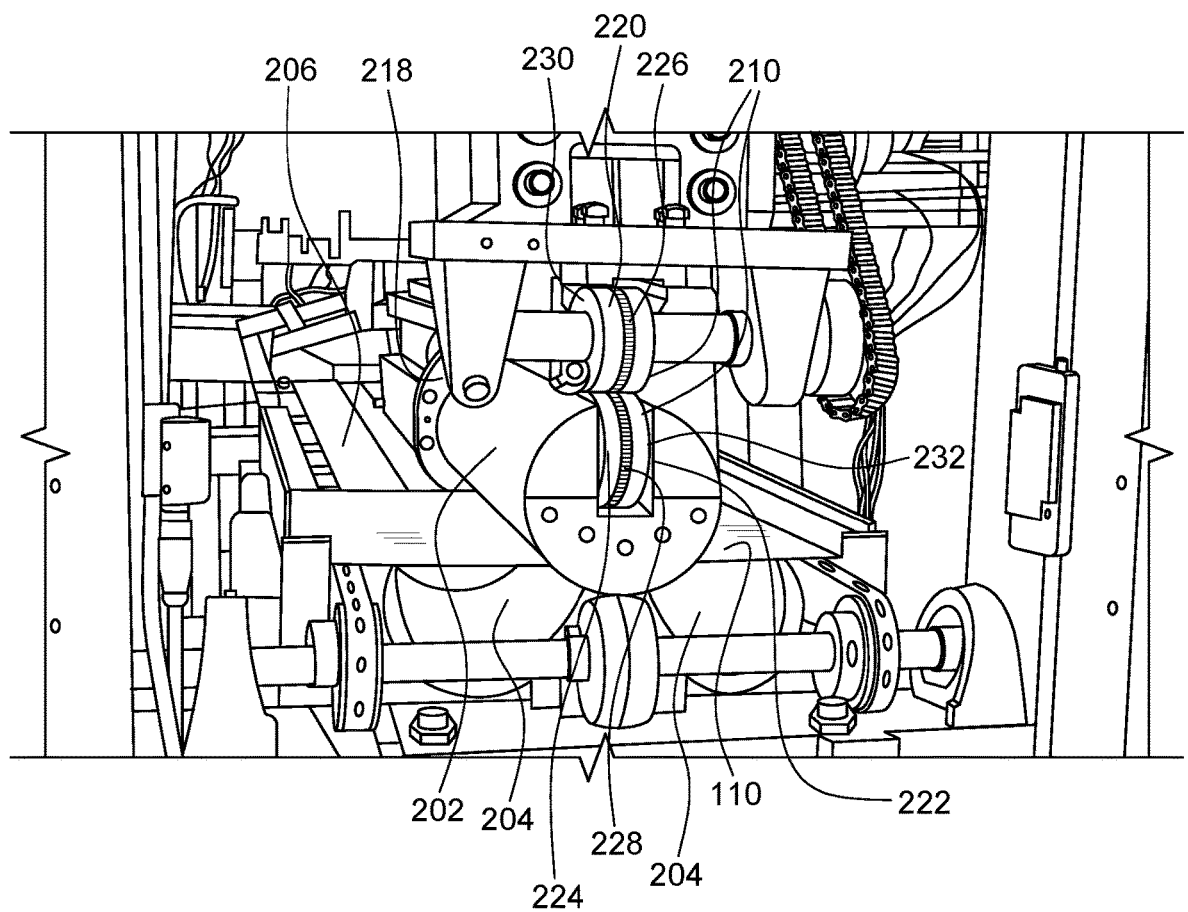

The tube forming machine 200 comprises a knurling wheel set 210, as illustrated in FIG. 15, which forcibly rolls a knurling pattern, such as a straight, angled, or crossed line pattern or others. The knurling wheel set 210 includes a set of wheels which are rigid and may comprise steel, iron, copper, aluminum, plastic, wood, rubber, cement, diamond, a metal alloy, or any combinations thereof. Note that knurling can include crimping.

As illustrated in FIG. 7, the wheel unit 208 comprises a housing that supports four transport wheels 212 configured to move the sheet 104 longitudinally, along the mandrel 202, although less than four transport wheels 212 are possible, such as at least one, and more than four transport wheels 212 are possible, such as six or twelve or more. Note that if there are more two or more of the transport wheels 212, then the two or more of the transport wheels 212 can be identical to or different from each other in any measurable property, such as material, shape, size, weight, density, rotational speed, rotational orientation, or others. Note that none, some, most, or all of the transport wheels 212 can be idler wheels or driver wheels in any combination, whether on one or both sides of the wheel unit 208.

The transport wheels 212 are automatically raised over the mandrel 202, such as via the wheel unit 208, when the pair of C-shaped jaws/clamp arms 204 are in the clamping position to clamp the sheet 110 or when the pair of C-shaped jaws/clamp arms 204 are in the non-clamping position and the sheet 104 is not positioned between the fourth conveyor 206 and the mandrel 202. Similarly, the transport wheels 212 are automatically lowered when the pair of C-shaped jaws/clamp arms 204 are in the non-clamping position and the sheet 110 is positioned between the fourth conveyor 206 and the mandrel 202.

Figure 8:
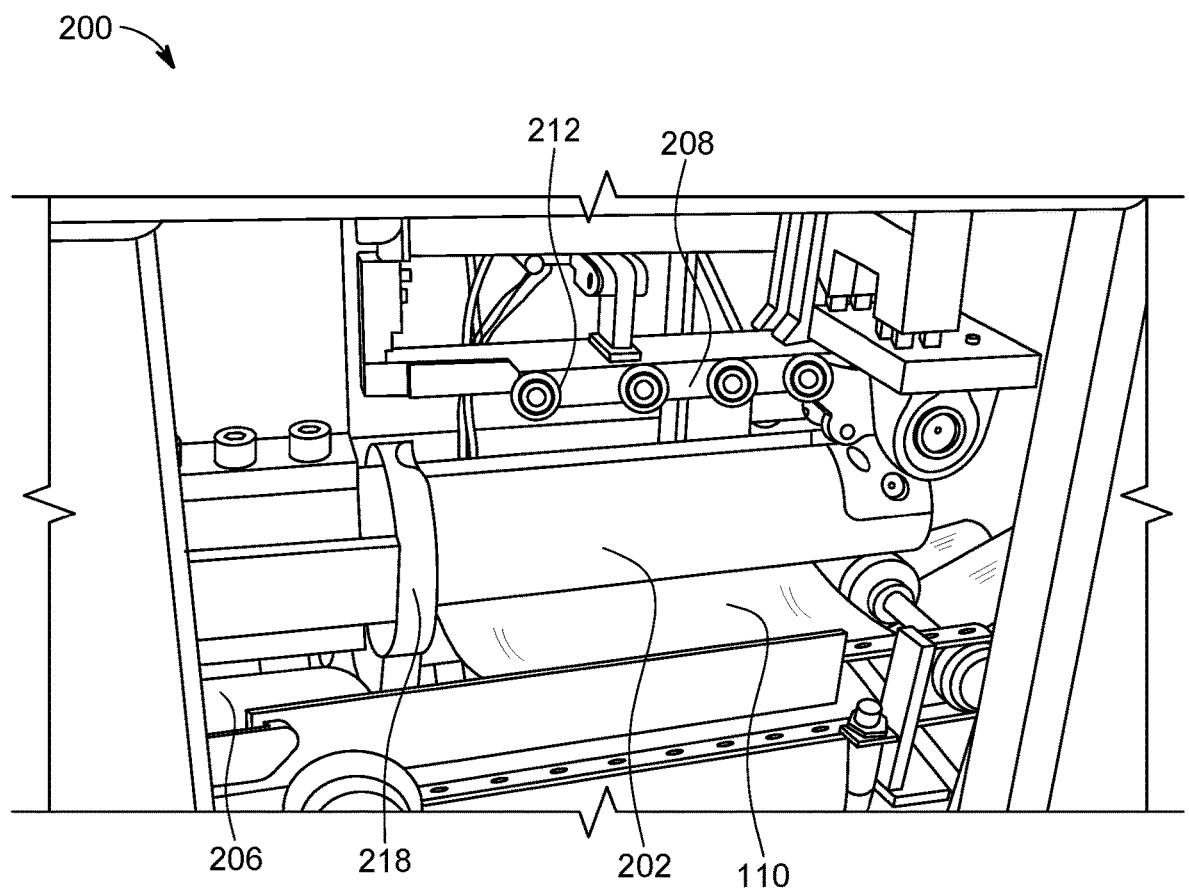
Figure 16:
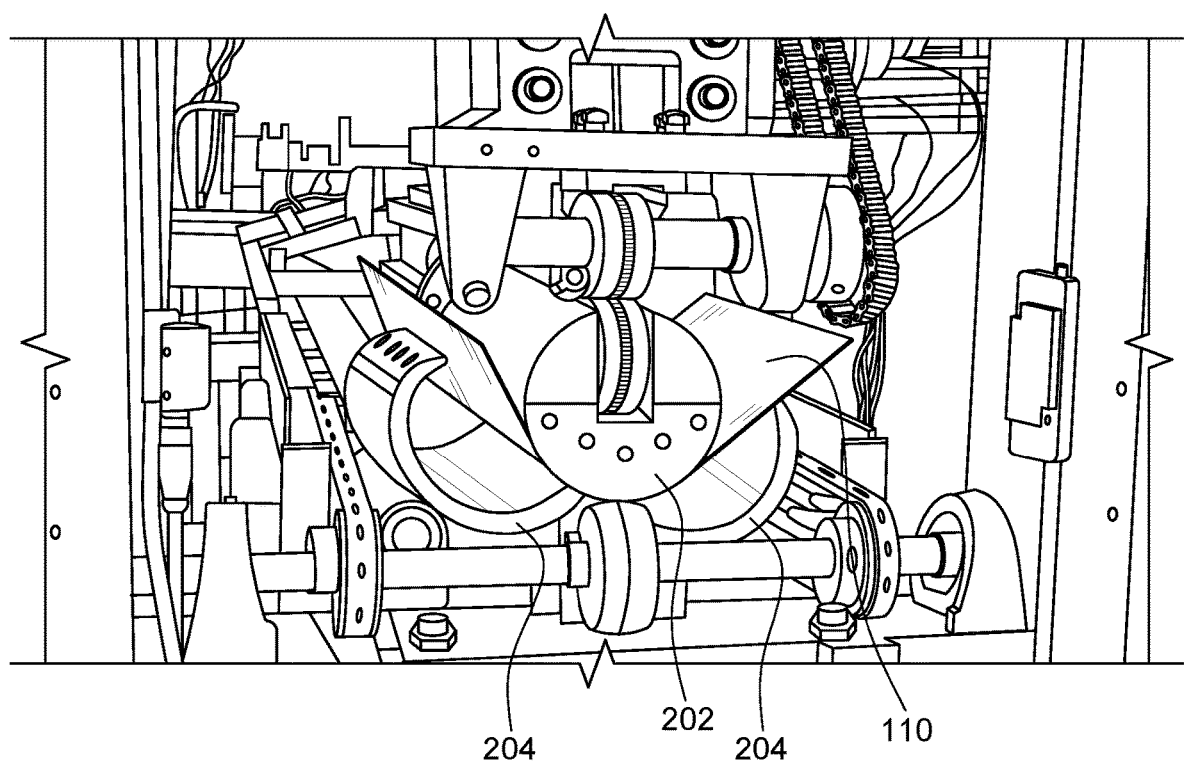
Figure 26:
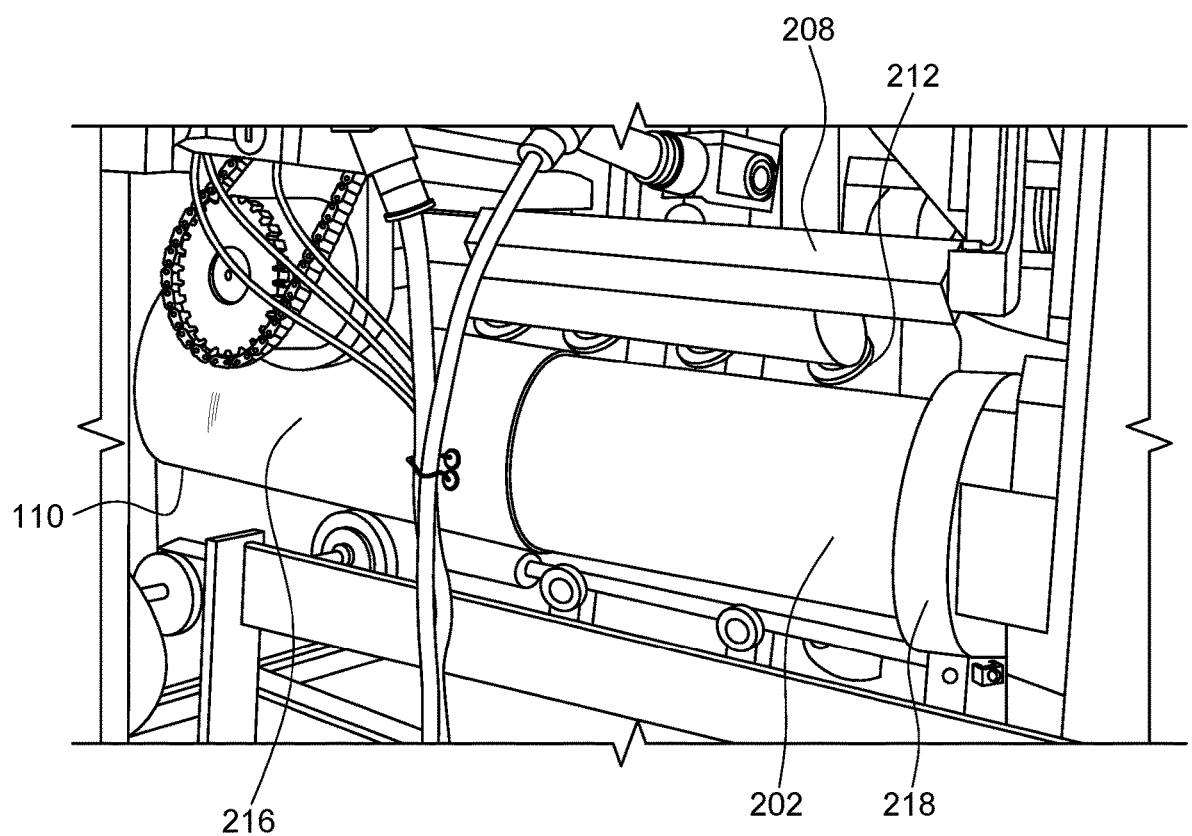

As illustrated in FIG. 8, the fourth conveyor 206 receives the sheet 110, with the pair of opposing longitudinal end portions 122, 124, as bent in the lock forming machine or the roll forming machine, such as those manufactured via Lockformer® company or others, or the press brake 118 into a locking configuration, such as illustrated in FIG. 4B, from the third conveyor 120. The fourth conveyor 206 transports the sheet 110 underneath the mandrel 202 such that the sheet 110 is between the mandrel 202 and the fourth conveyor 206, with the pair of C-shaped jaws/clamp arms 204 being in the non-clamping position and with the transport wheels 212 being raised above the mandrel 202, such as via the wheel unit 208. As illustrated in FIG. 16, the pair of C-shaped jaws/clamp arms 204 inwardly pivot about the axis longitudinally parallel to the mandrel 202 such that the pair of C-shaped jaws/clamp arms 204 longitudinally bend the sheet 110 about the mandrel 202 and along the mandrel 202, such as into a circular cross-sectional shape, and the pair of opposing longitudinal end portions 122, 124, as previously bent into the locking configuration via the lock forming machine or the roll forming machine, such as those manufactured via Lockformer® company or others, or the press brake 118, lock/engage with each other. Note that, as illustrated in FIG. 4I, a seam 214 may form longitudinally on the sheet 110, as bent into a tube 216, along the locking configuration. However, note that such lock/engagement may still allow for a fluid leakage from within the tube 216 to outside the tube 216 or vice versa, such as via the seam 214. Therefore, upon the pair of opposing longitudinal end portions 122, 124, as bent into the locking configuration, locking/engaging with each other, the transport wheels 212 are automatically lowered and the sheet 110 is pushed via a movable base portion 218 of the mandrel 202, as illustrated in FIG. 26. For example, the movable base portion 218 can move based on a horizontally longitudinal plunging force, where the movable base portion 218 pushes the tube 216 for a limited time period or a limited distance and then retracts into a default position thereof. Then, upon such pushing, the transport wheels 212 receive and roll the sheet 110, as bent into the tube 216, which may be together with the fourth conveyor 206, in whole or in part, to the knurling wheel set 210 to apply the knurling pattern over the pair of opposing longitudinal end portions 122, 124, as bent into the locking configuration, locking/engaging with each other, such as over the seam 214, as the transport wheels 212 or the fourth conveyor 206 transport the sheet 110 bent into the tube 216 away from the mandrel 202, such as into a container or a basket.

Note that as the knurling wheel set 210 applies the knurling pattern, as shown in FIG. 4I, such application may flatten and tightly lock the pair of opposing longitudinal end portions 122, 124 into the locking configuration. This allows an automatic forming of tubular structures in various diameters, such as four inches, six inches, eight inches, or others, and in various material types, such as aluminum, galvanized steel, or others. Further, the locking configuration may prevent a formation of a gap between various layers of metals, which makes the locking configuration relatively fluid tight, such as airtight or watertight. Moreover, the knurling pattern ensures that the locking configuration does not open up and create a gap, which may facilitate fluid leakage, such as air leakage, i.e., the knurling pattern stiffens and strengthens the locking configuration.

FIG. 8 shows the sheet 110 supported via the fourth conveyor 206 underneath the mandrel 202. Note that the transport wheels 212 are raised above the mandrel 202, such as via the wheel unit 208.

Figure 9:
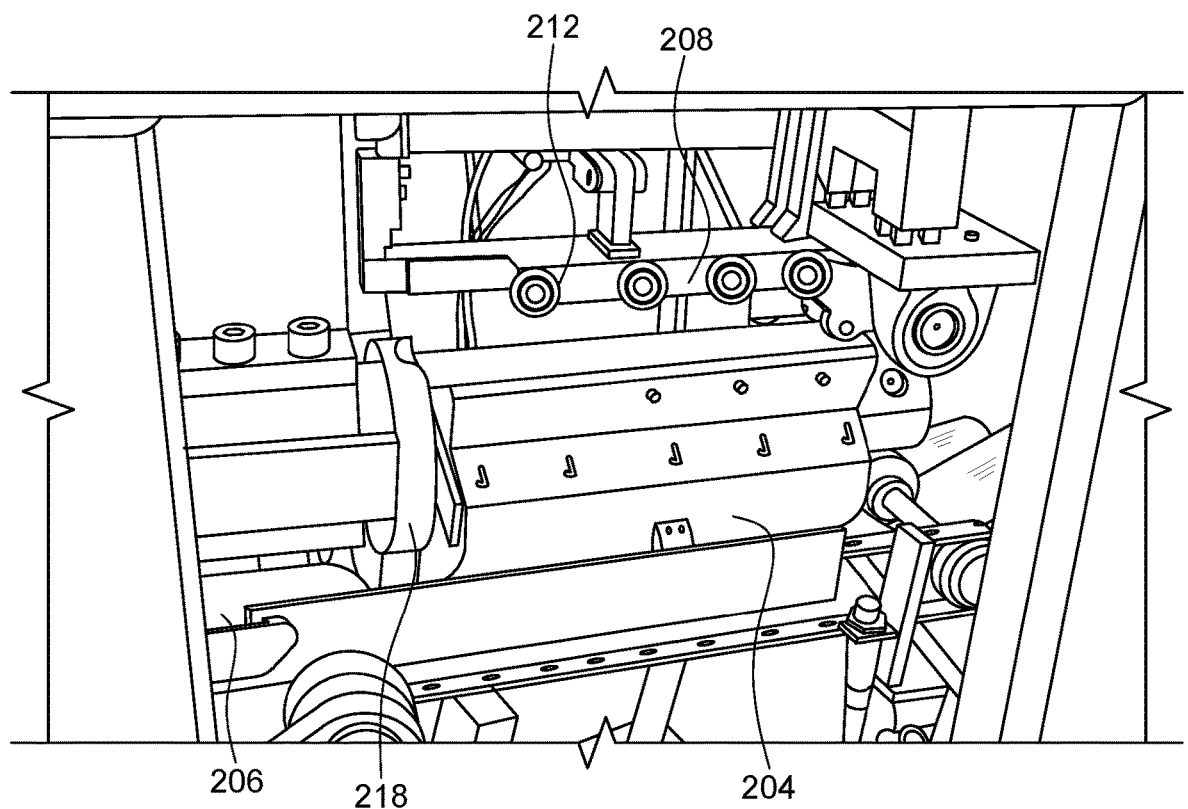
Figure 12:
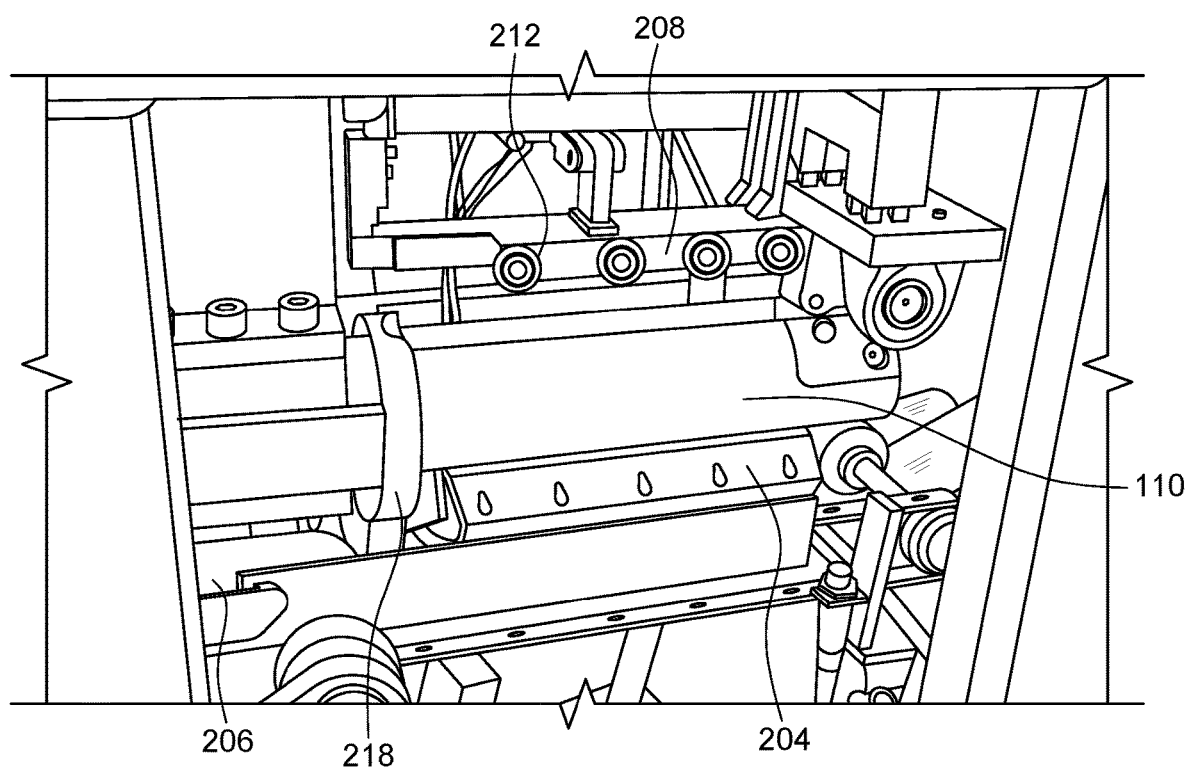

FIG. 9 and FIG. 12 shows the sheet 110 being longitudinally bent, along the pair of opposing longitudinal end portions 122, 124, about the mandrel 202 via the pair of C-shaped jaws/clamp arms 204 as the pair of C-shaped jaws/clamp arms 204 pivot from the non-clamping position to the clamping position such that the pair of opposing longitudinal end portions 122, 124 bent in the lock forming machine or the roll forming machine, such as those manufactured via Lockformer® company or others, or the press brake 118 into the locking configuration lock/engage with each other. Note that the transport wheels 212 are raised above the mandrel 202, such as via the wheel unit 208.

Figure 10:
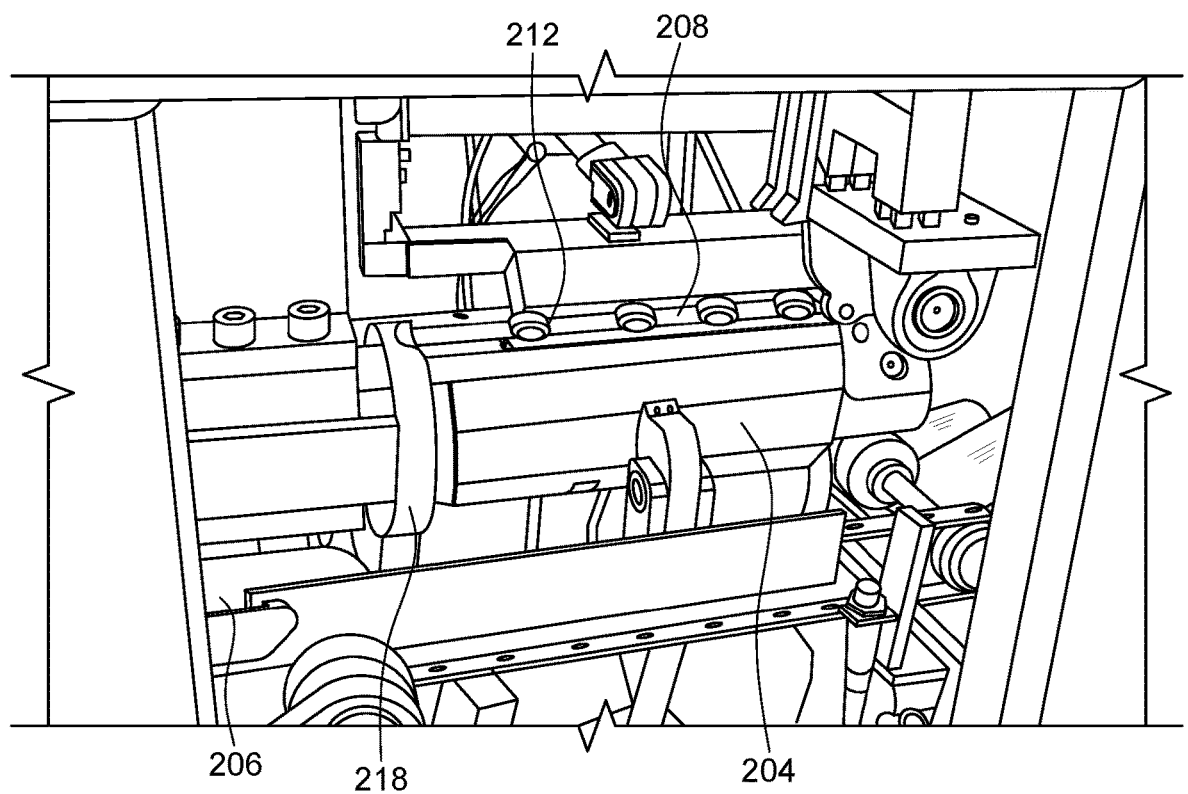

FIG. 10 shows the transport wheels 212 lowered and the knurling wheel set 210 applying the knurling pattern over the pair of opposing longitudinal end portions 122, 124 locking/engaging each other.

Figure 11:
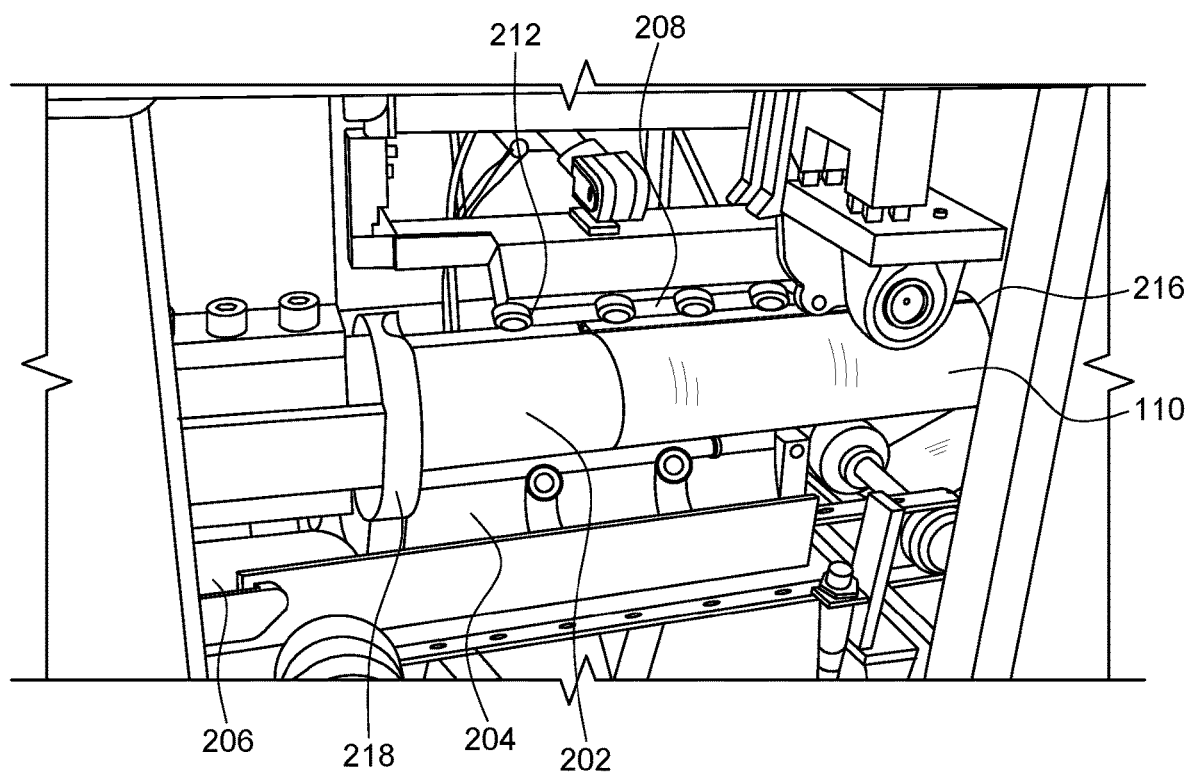
Figure 13:
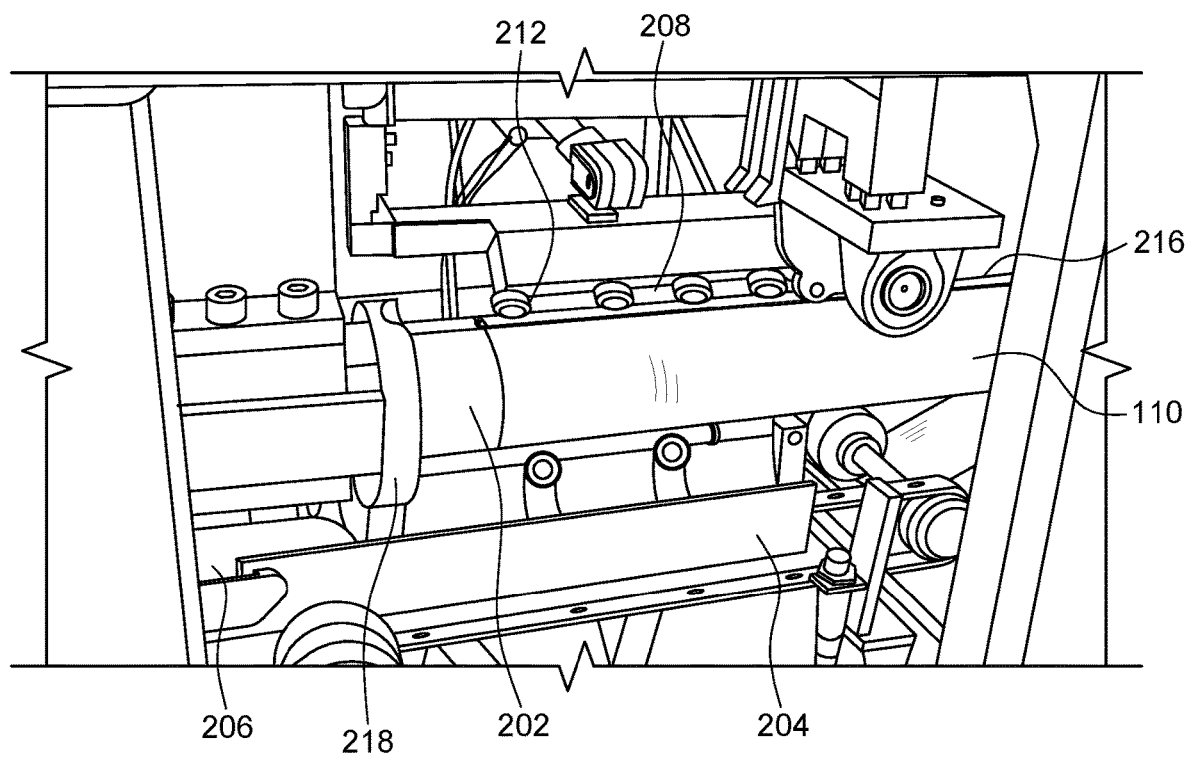

FIG. 11 and FIG. 13 shows the sheet 110 being transported into the container or the basket via the fourth conveyor 206 as the knurling wheel set 210 applies the knurling pattern onto the sheet 110 over the pair of opposing longitudinal end portions 122, 124 locking/engaging each other.

Figure 14:
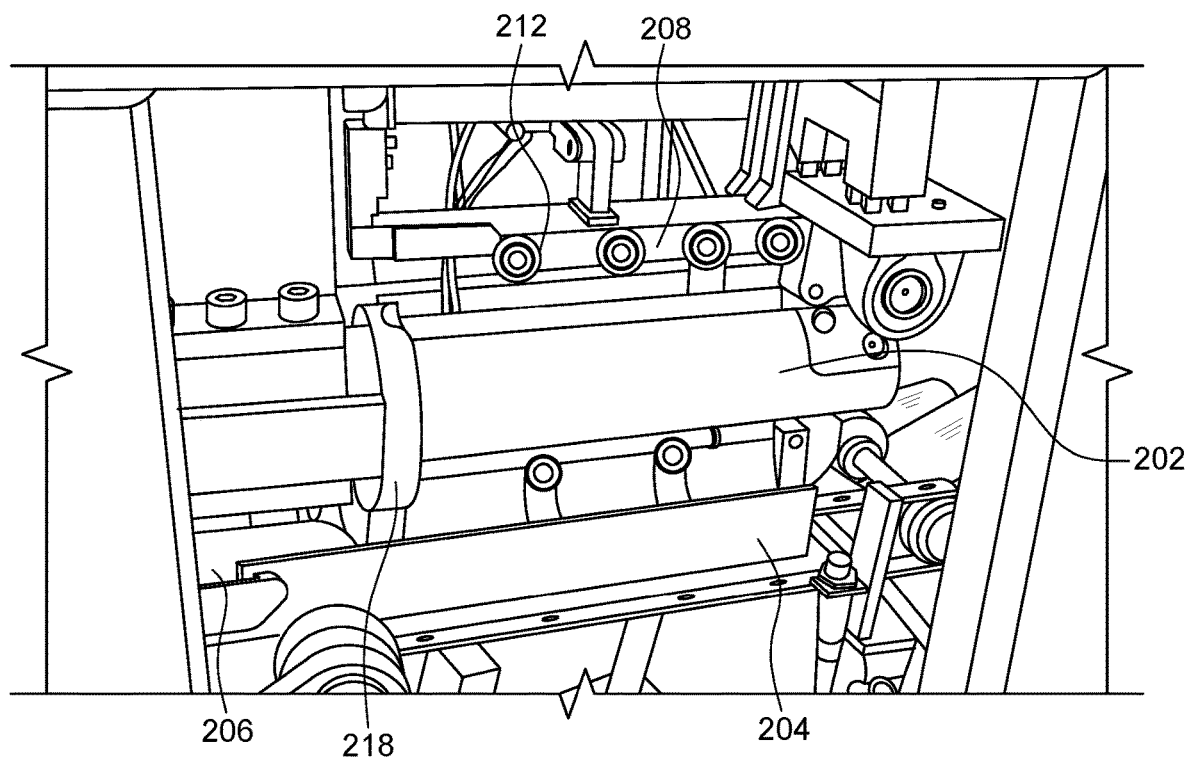

FIG. 14 shows the transport wheels 212 being raised above the mandrel 202, such as via the wheel unit 208, when the sheet 110 is not between the fourth conveyor 206 and the mandrel 202 and the pair of C-shaped jaws/clamp arms 204 are in the non-clamping position.

FIG. 15 shows a frontal view of the mandrel 202, the knurling wheel set 210, the fourth conveyor 206, and the pair of C-shaped jaws/clamp arms 204 in the non-clamping position. Note that the knurling wheel set 210 includes a first knurling wheel unit 220 and the knurling pattern is a first knurling pattern 226. Note that the mandrel 202 contains a cavity 222 internally hosting a second knurling wheel unit 224 opposing the first knurling wheel unit 220 such that the first knurling wheel unit 220 and the second knurling wheel unit 224 can engage with each other, such as via meshing or others, such as without the sheet 110 therebetween, such as directly. For example, the mandrel 202 can be C-shaped, U-shaped, or others. For example, the cavity 222 can be U-shaped, C-shaped, or others. The second knurling wheel unit 224 applies a second knurling pattern 228 to the sheet 110 onto the pair of opposing longitudinal end portions 122, 124 locking/engaging each other, yet from an inside of the tube 216 formed from the sheet 110, i.e., since the sheet 110 has a first side (outer side) and a second side (inner side), the first knurling wheel unit 220 knurls from the first side to apply the first knurling pattern 226 and the second knurling wheel unit 224 knurls from the second side applying the second knurling pattern 228. For example, the first knurling wheel unit 220 comprises a first knurling wheel 230 and the second knurling unit 224 comprises a second knurling wheel 232, where the first knurling wheel 230 may mesh with the second knurling wheel 232, such as when the sheet 110 is not between the first knurling wheel 230 and the second knurling wheel 232. Note that the first knurling pattern 226 and the second knurling pattern 228 can be identical to or different from each other in any manner, such as size, shape, pattern, orientation, direction, or others. The second knurling wheel unit 224 can be driven independent of the first knurling wheel unit 220 or the first knurling wheel unit 220 and the second knurling wheel unit 224 can be dependently driven or driven via a single drive/engine/motor. Note that the first knurling wheel 230 or the second knurling wheel 232 can be an idler wheel or a driver wheel in any combination, although as illustrated in FIG. 15, the first knurling wheel 230 is the driver wheel and the second knurling wheel 232 is the idler wheel.

Figure 17:
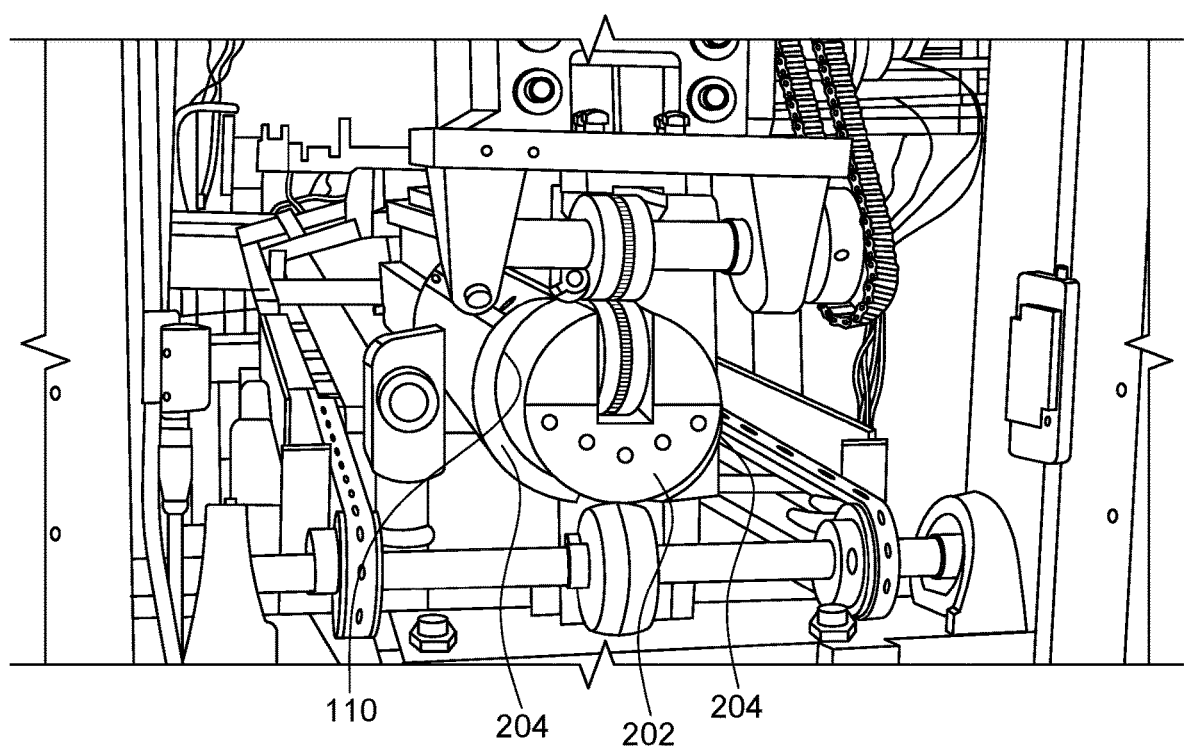

FIG. 16 and FIG. 17 show the pair of C-shaped jaws/clamp arms 204 pivoting into the clamping position such that the sheet 110 is bent into the tube 216 about the mandrel 202 and along the mandrel 202, such as into a circular cross-sectional shape, and the pair of opposing longitudinal end portions 122, 124, as previously bent into the locking configuration, lock/engage with each other. Note that the seam 214 is formed longitudinally on the sheet 110 along the locking configuration. Note that the transport wheels 212 are raised, such as via the wheel unit 208.

Figure 18:
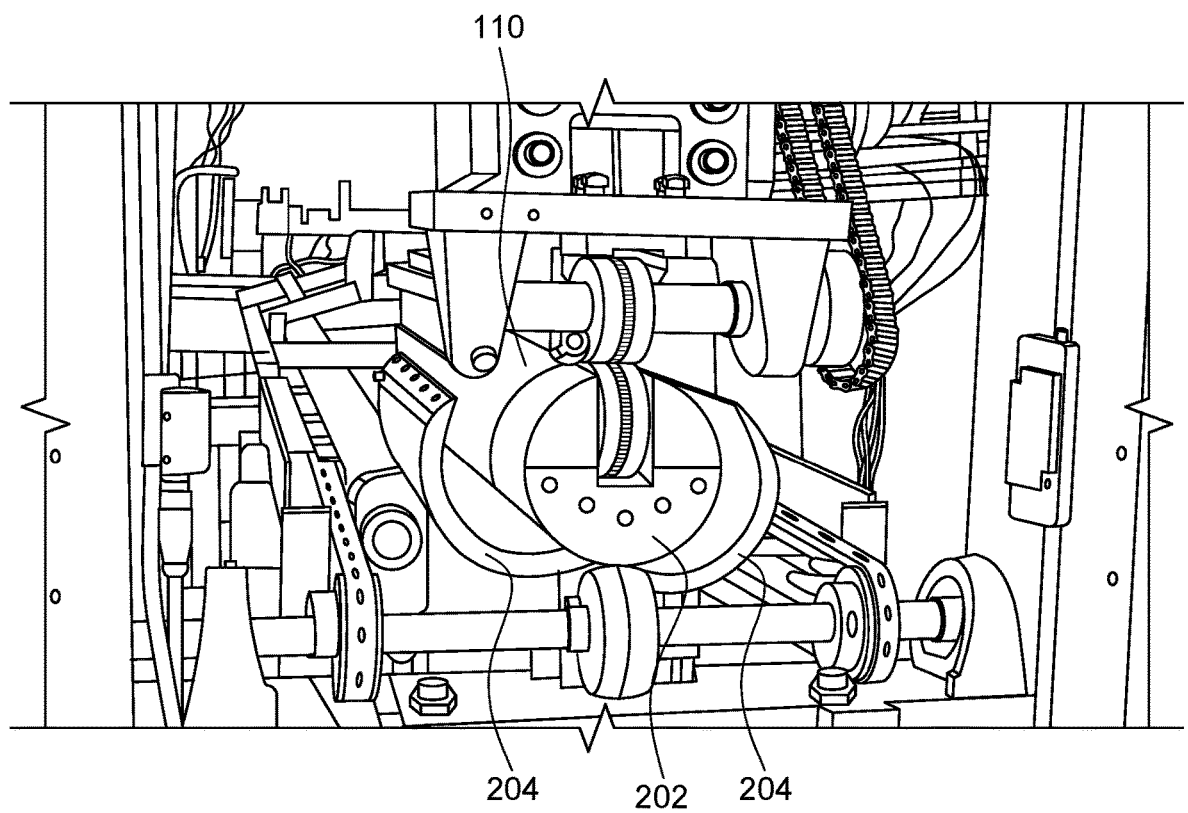

FIG. 18 shows the pair of C-shaped jaws/clamp arms 204 pivoting into the non-clamping position prior to another sheet being transported by the fourth conveyor 206 to be positioned between the fourth conveyor 206 and the mandrel 202. Note that the sheet 110 has been bent into the tube 216 via the pair of C-shaped jaws/clamp arms 204. Further, note that although the pair of C-shaped jaws/clamp arms 204 is illustrated as pivoting asymmetrically, other variations are possible, such as the pair of C-shaped jaws/clamp arms 204 pivoting symmetrically or others.

Figure 19:
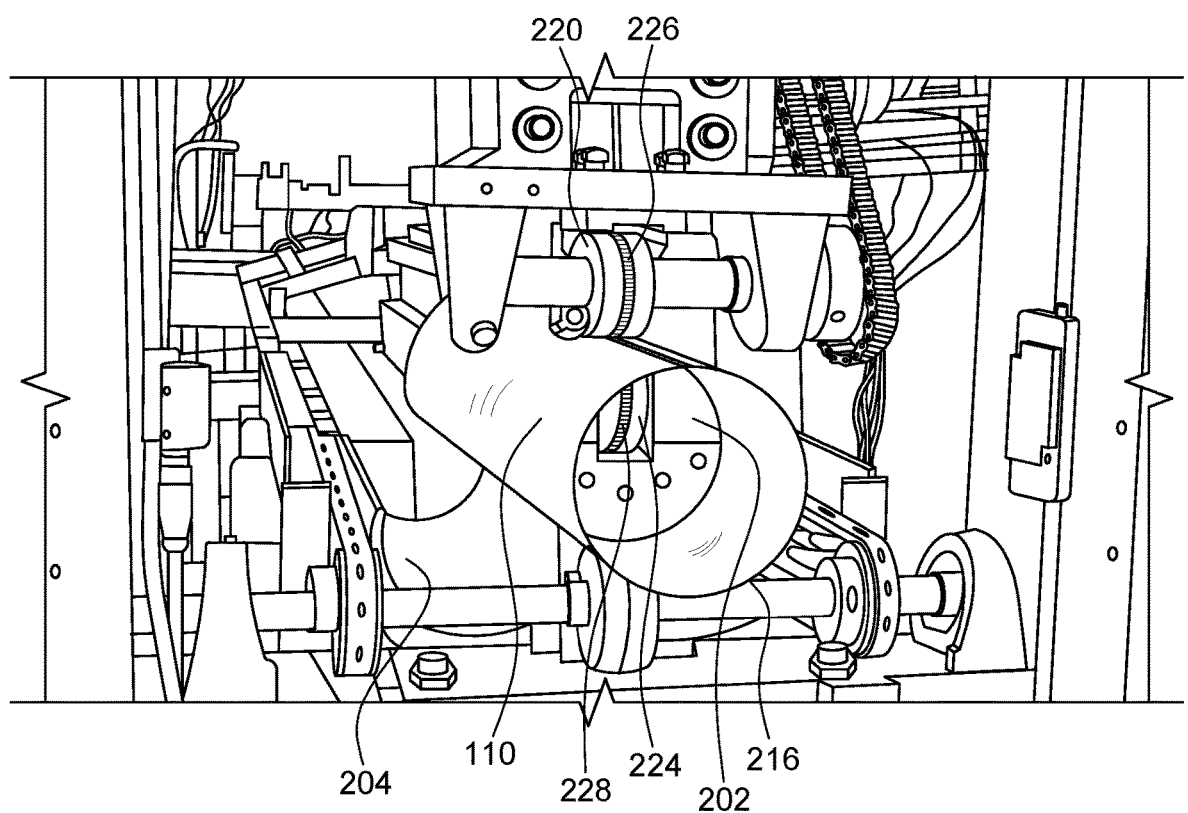
Figure 20:
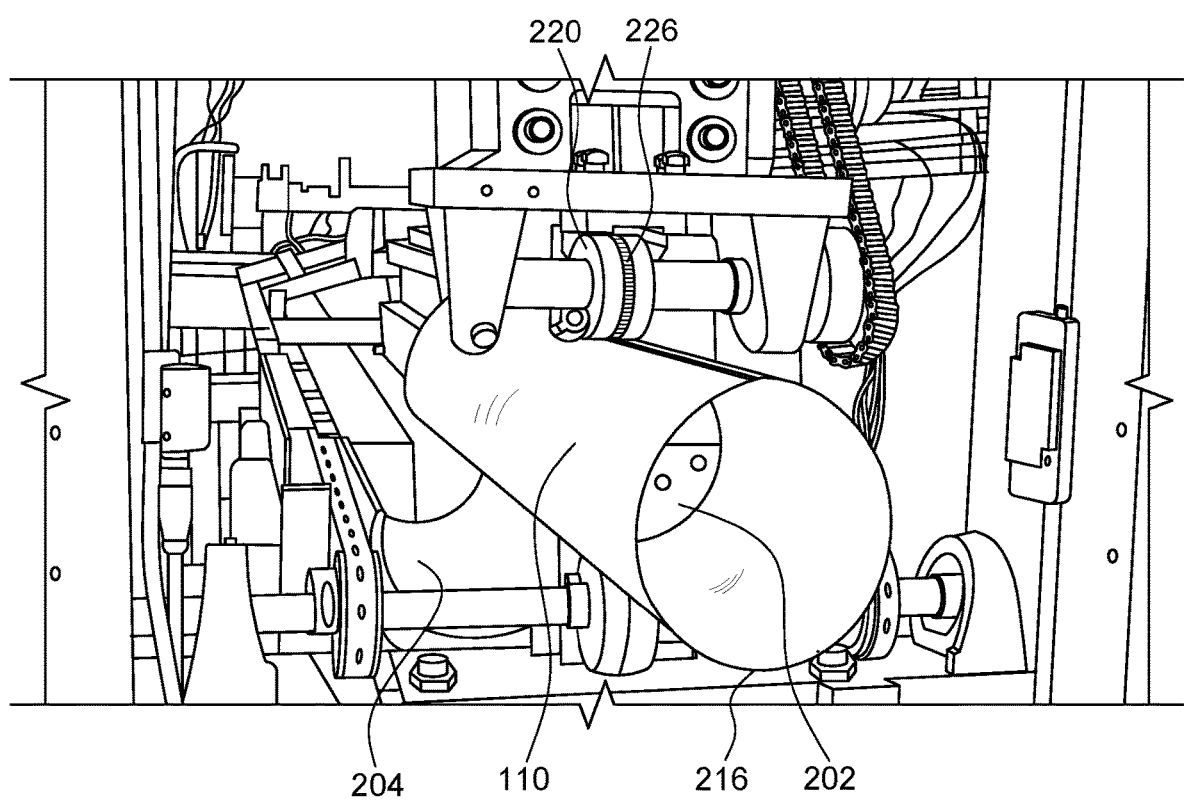

FIG. 19 and FIG. 20 show the sheet 110 bent into the tube 216 being transported into a container by the fourth conveyor 206, the transport wheels 212, as lowered, the first knurling wheel unit 220, and the second knurling wheel unit 224. Note that the pair of opposing longitudinal end portions 122, 124 are locking/engaging each other, while having the first knurling pattern 226 imparted thereon externally and the second knurling pattern 228 imparted thereon internally.

Figure 21:
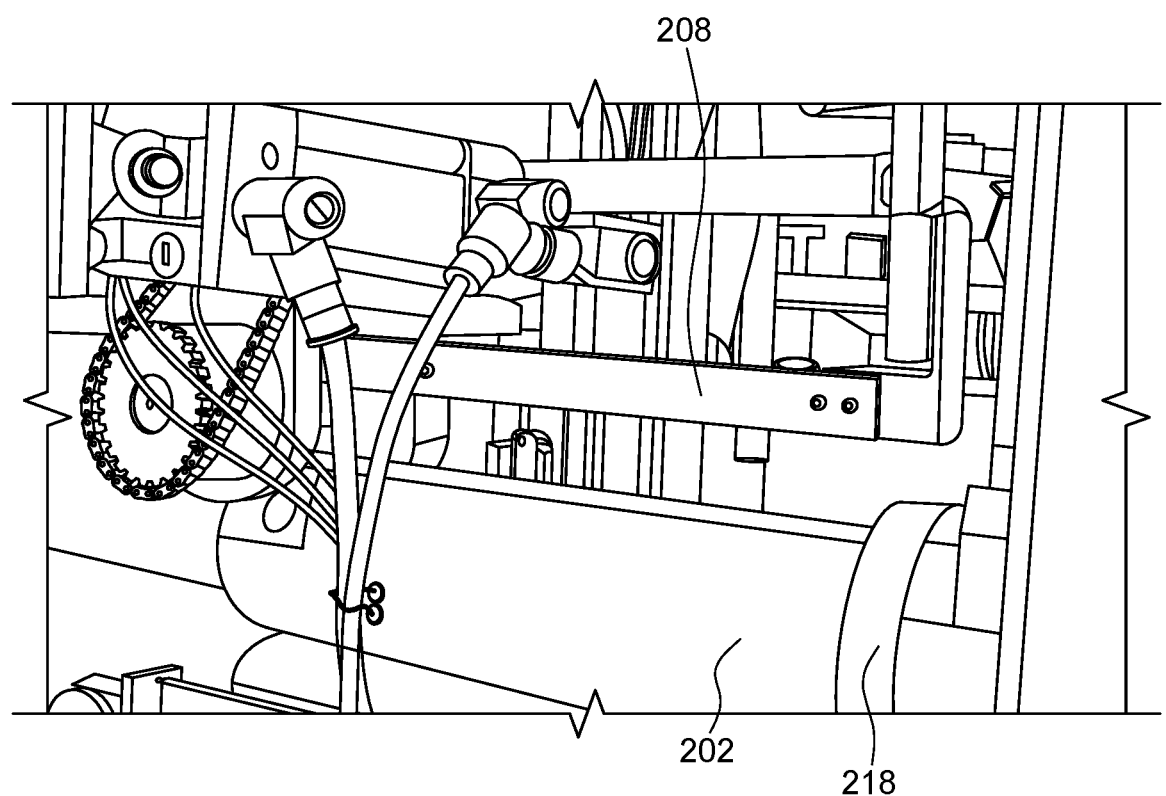
Figure 22:
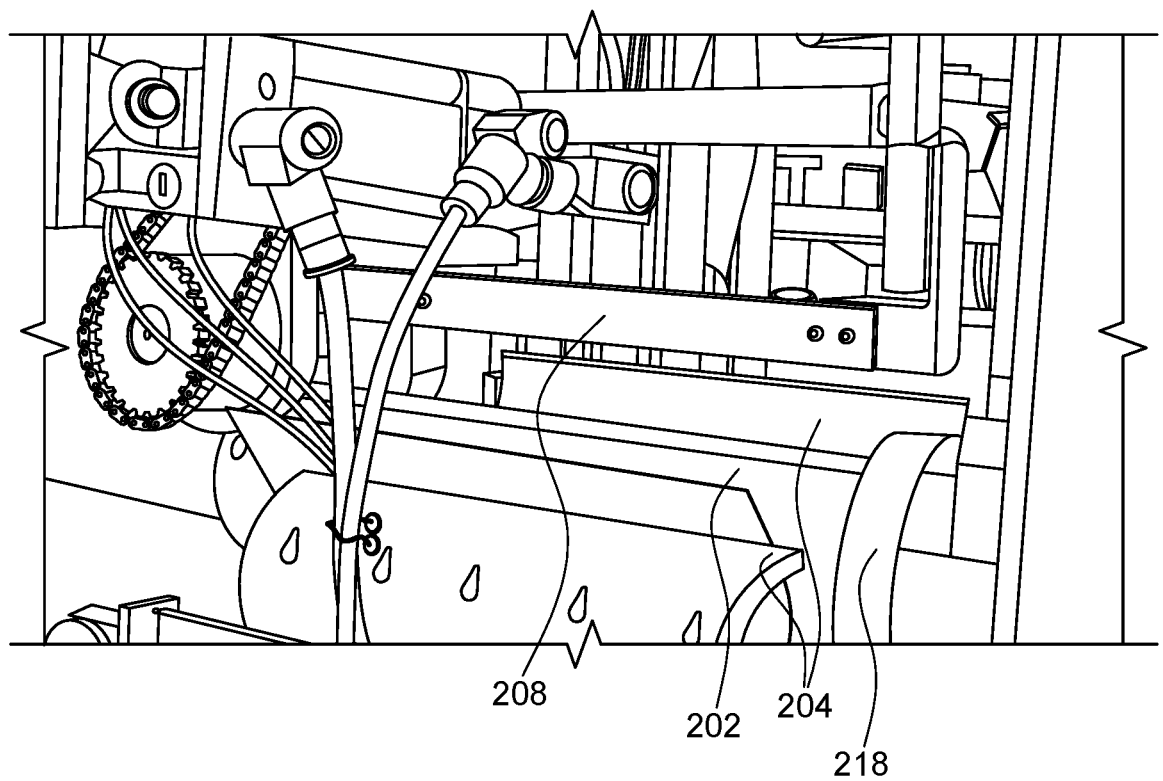
Figure 23:
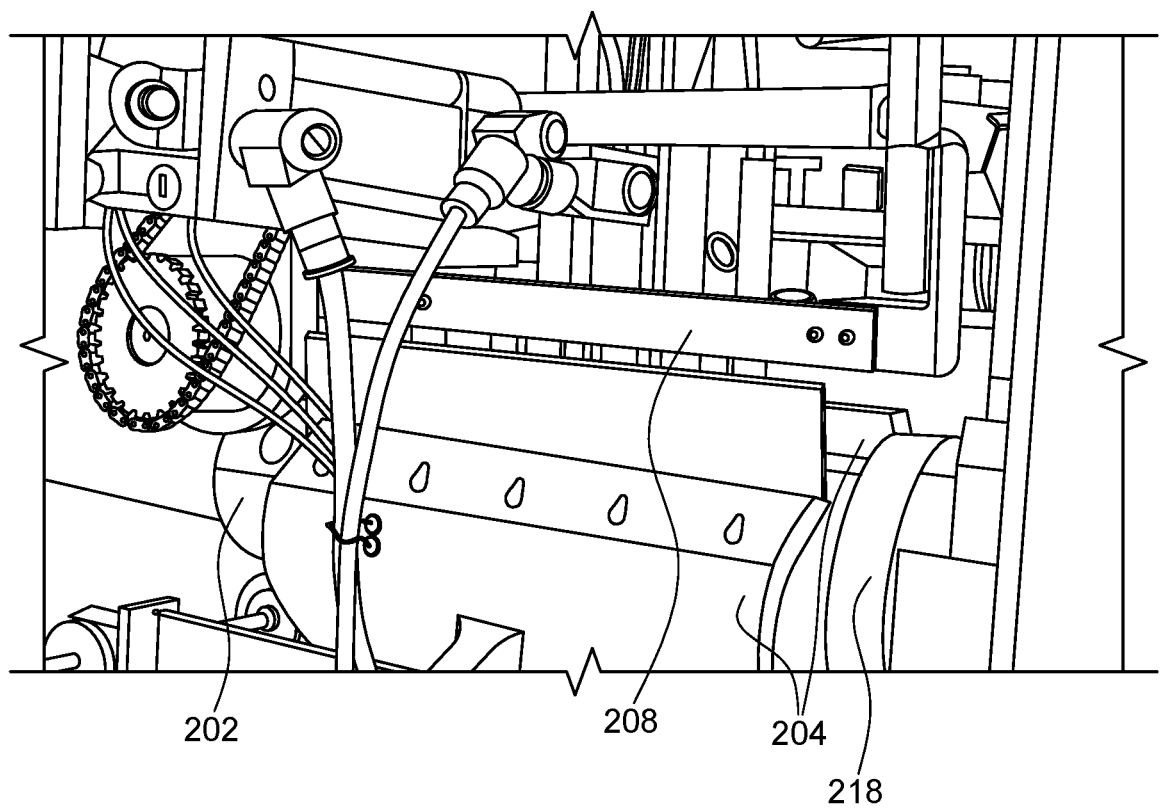
Figure 24:
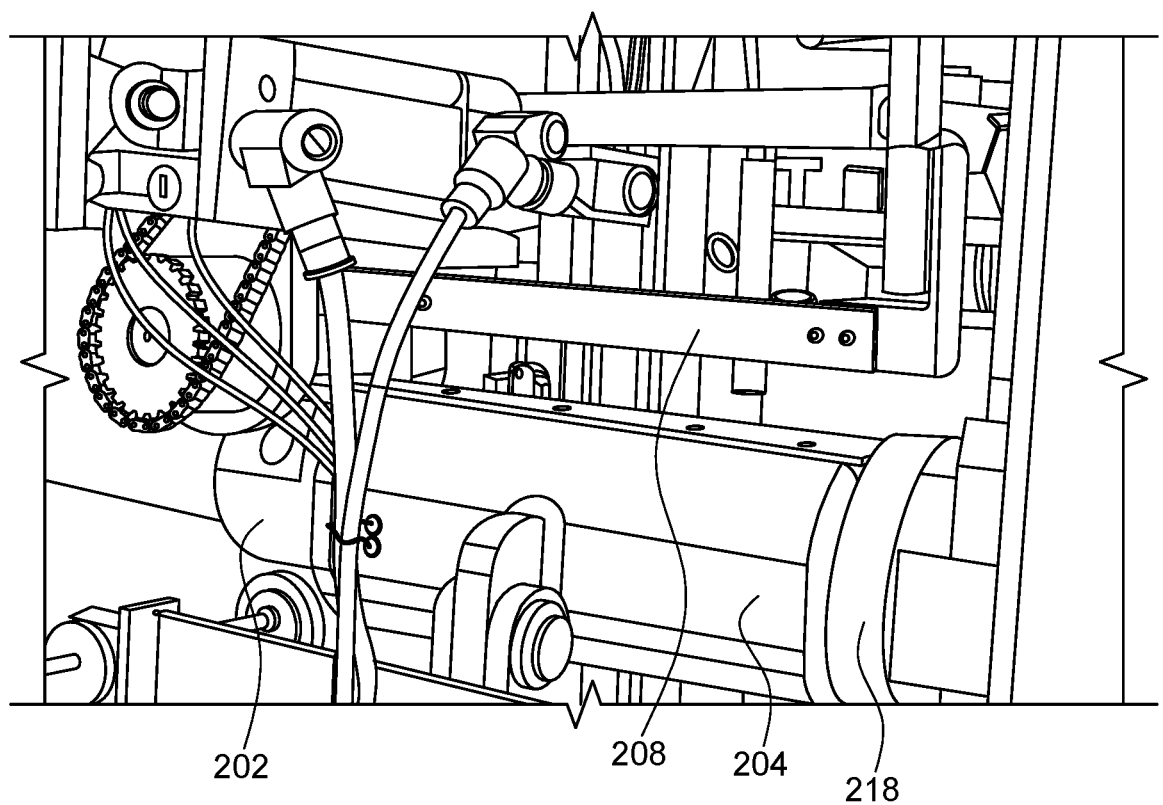

FIG. 21 shows a back view of the mandrel 202, where the transport wheels 212 are raised, such as via the wheel unit 208.

FIG. 22, FIG. 23, FIG. 24, and FIG. 28 show a back view of the mandrel 202, where the pair of C-shaped jaws/clamp arms 204 are pivoting into the clamping position to bend the sheet 110 into the tube 216 about the mandrel 202 and along the mandrel 202, such as into a circular cross-sectional shape, and lock/engage the pair of opposing longitudinal end portions 122, 124, as previously bent into the locking configuration, with each other.

Figure 25:
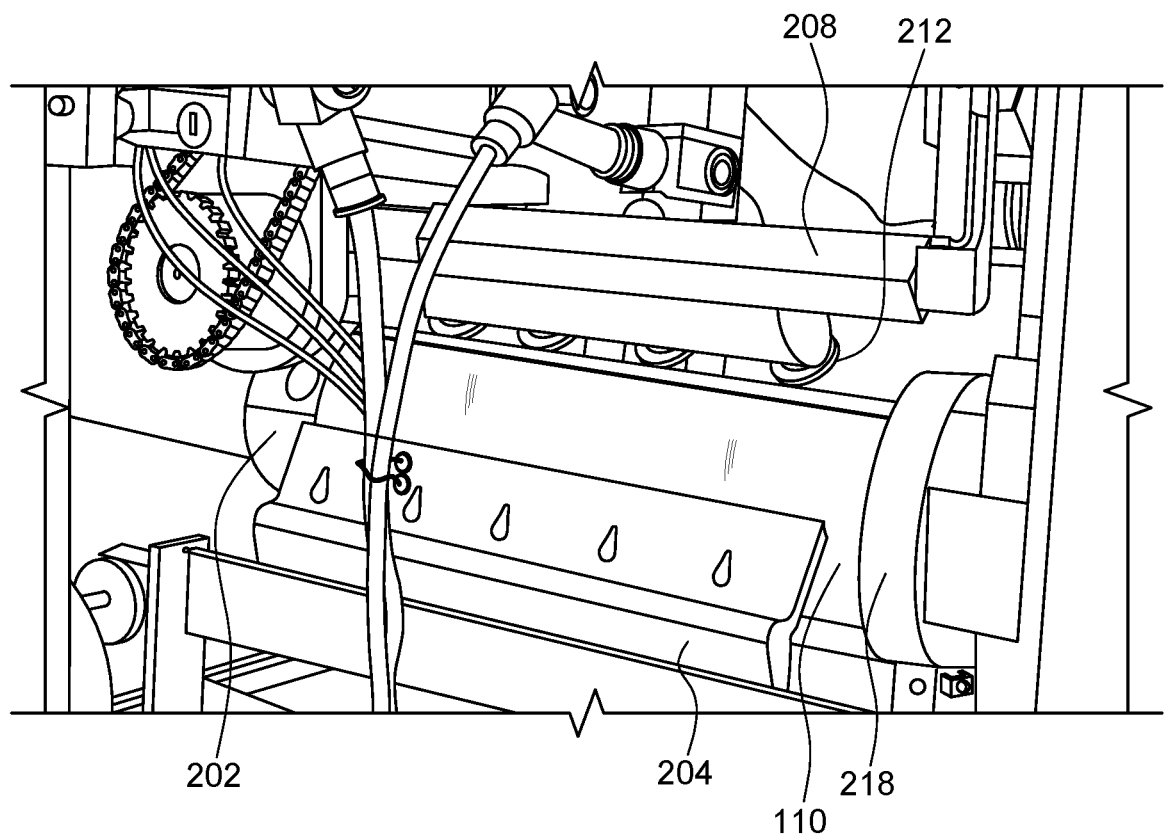

FIG. 25 shows a back view of the mandrel 202, where the transport wheels 212 are lowered, such as via the wheel unit 208, to transport the sheet 110 bent into the tube 216, which may be together with the fourth conveyor 206. Note that the pair of C-shaped jaws/clamp arms 204 pivoting into the non-clamping position.

FIG. 26 shows a back view of the mandrel 202, where the transport wheels 212 are lowered, such as via the wheel unit 208, to transport the sheet 110 bent into the tube 216, which may be together with the fourth conveyor 206. Note that the pair of C-shaped jaws/clamp arms 204 are in the non-clamping position.

Figure 27:
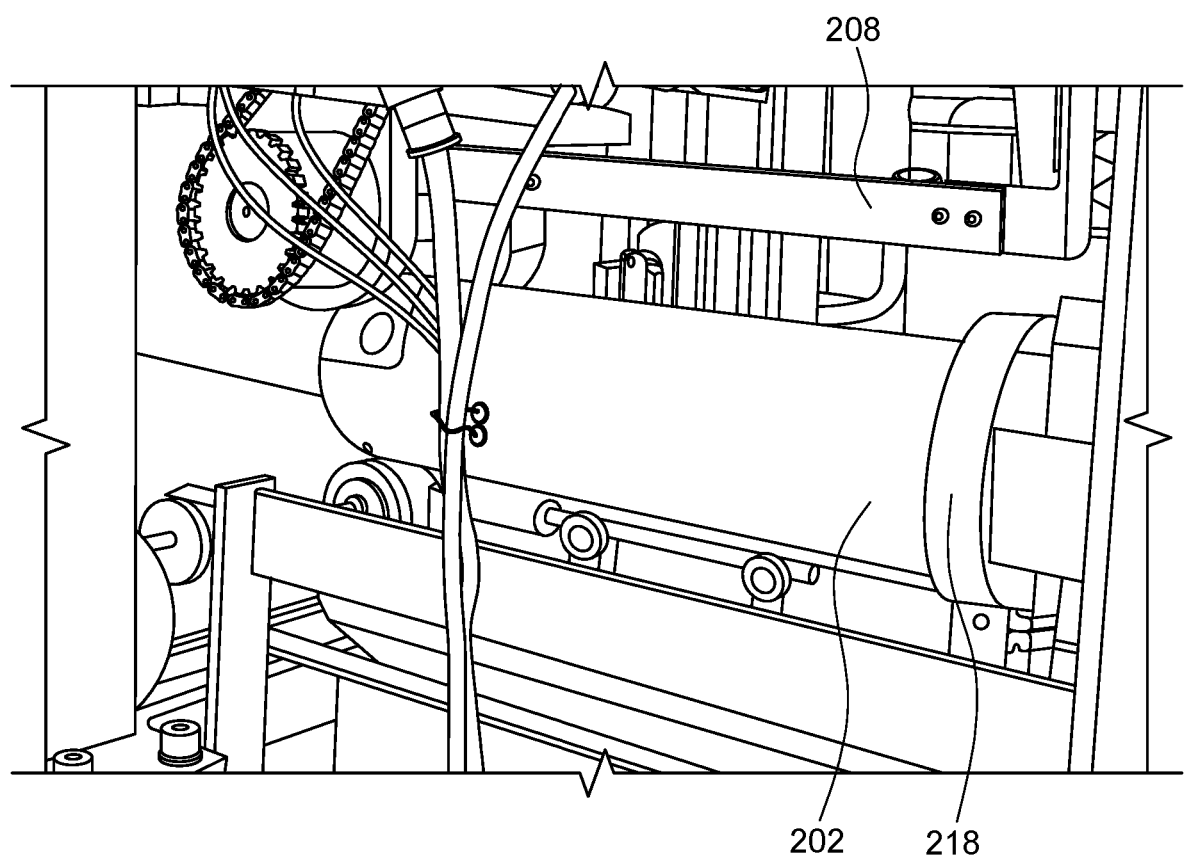
Figure 28:
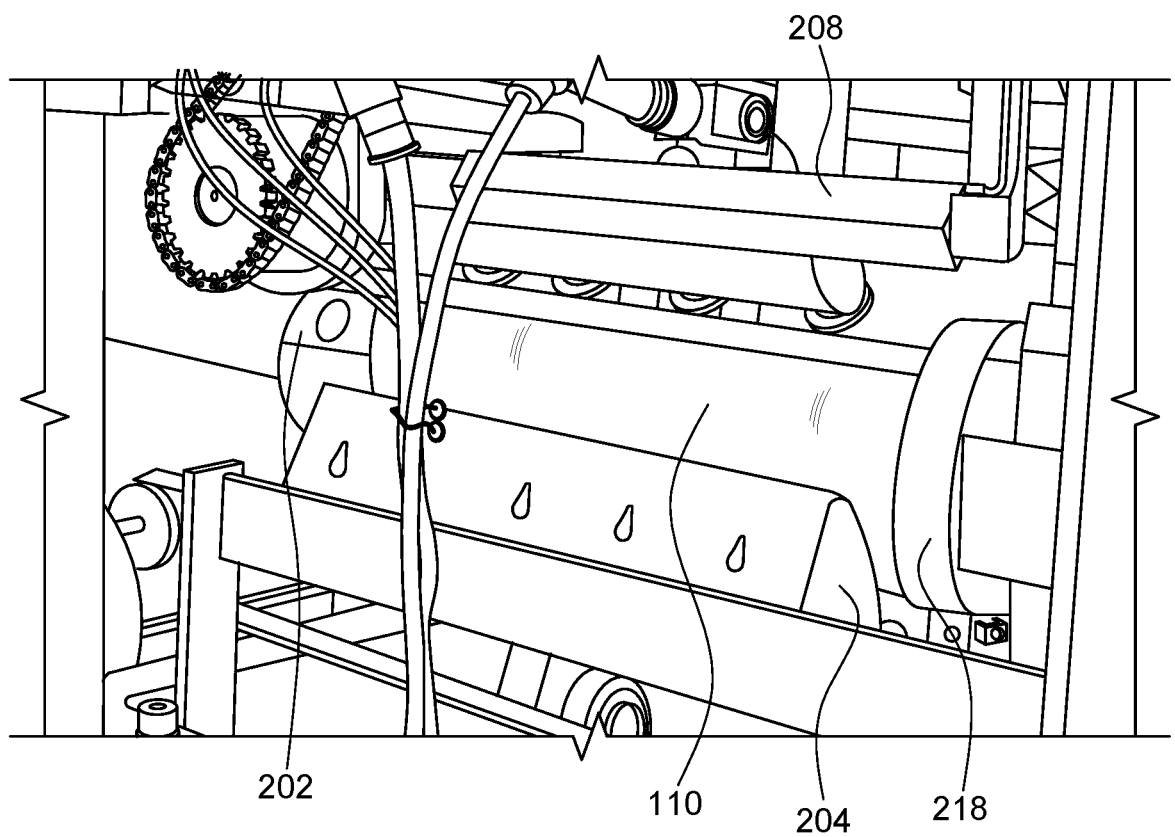

FIG. 27 shows a back view of the mandrel 202, where the transport wheels 212 are raised, such as via the wheel unit 208, and the pair of C-shaped jaws/clamp arms 204 are in the non-clamping position.

Figure 29:
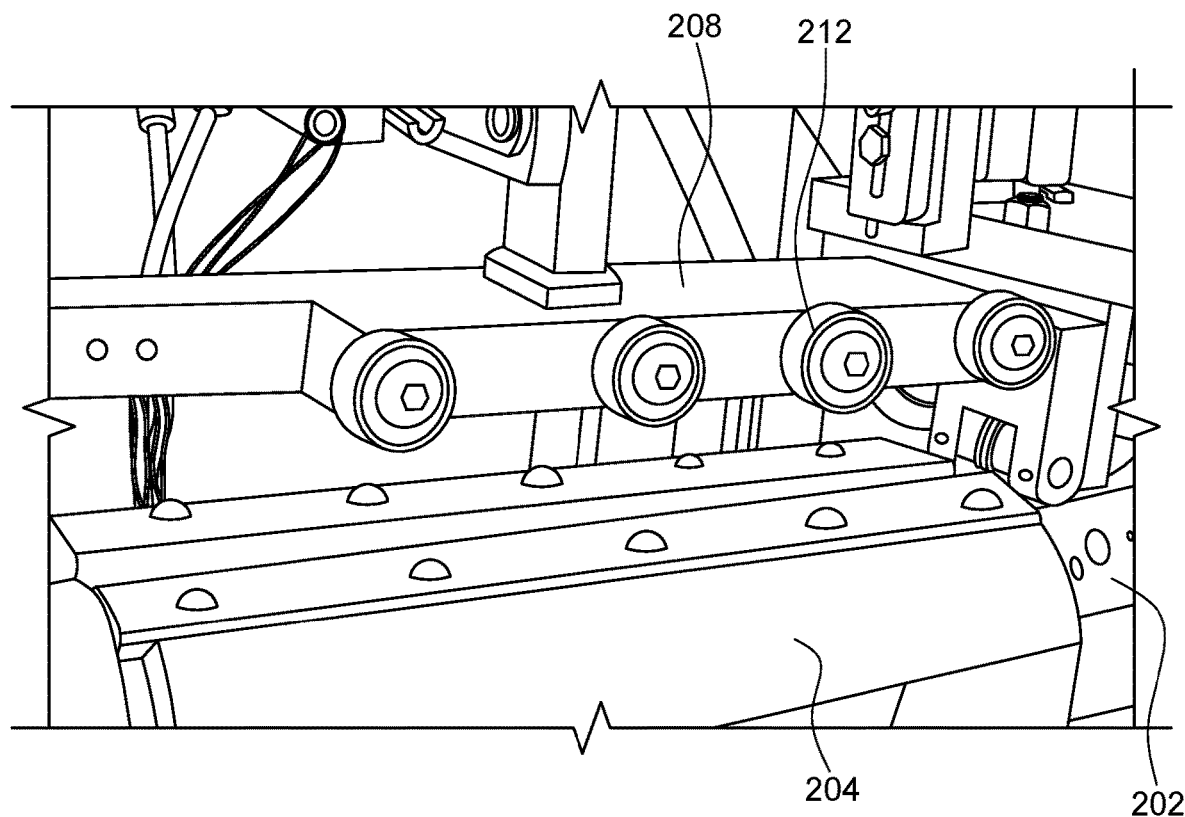

FIG. 29 shows the transport wheels 212 raised above the mandrel 202, such as via the wheel unit 208, as the pair of C-shaped jaws/clamp arms 204 are in the clamping position.

Figure 30:
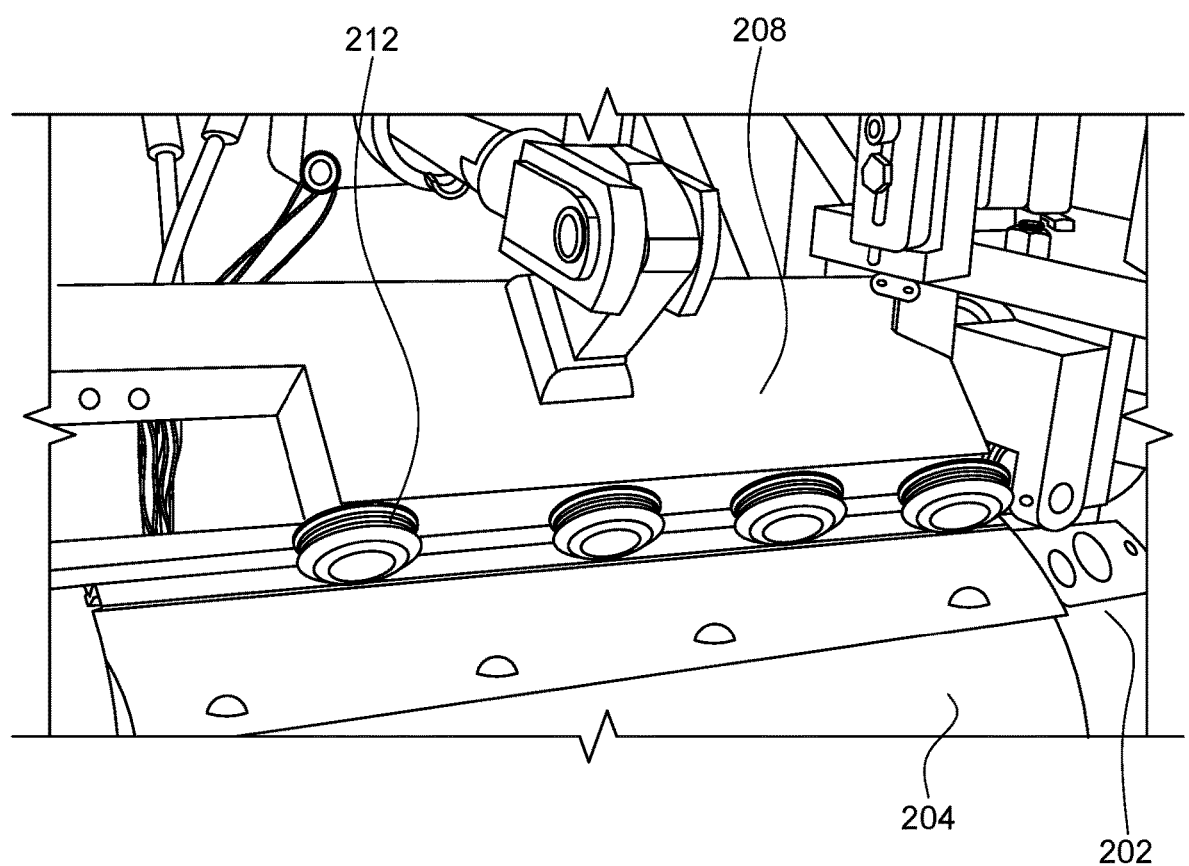
Figure 31:
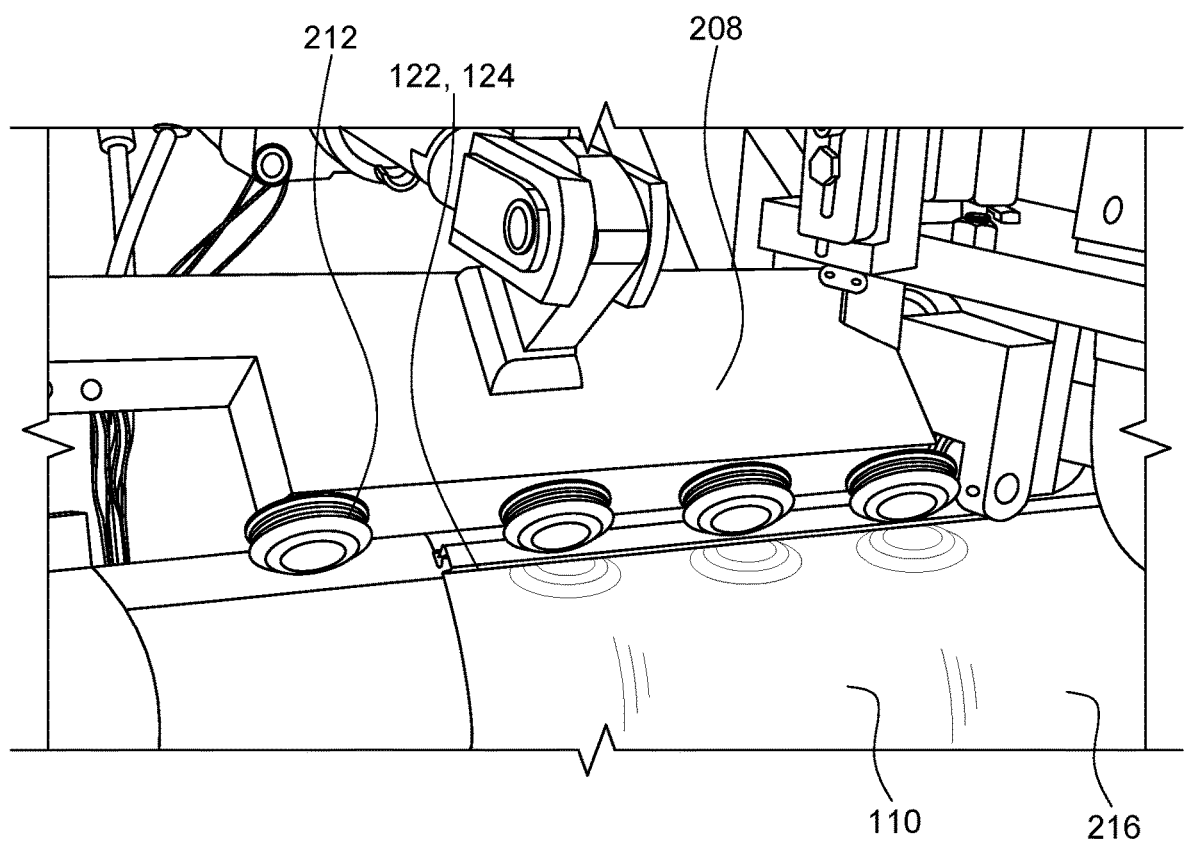
Figure 34:
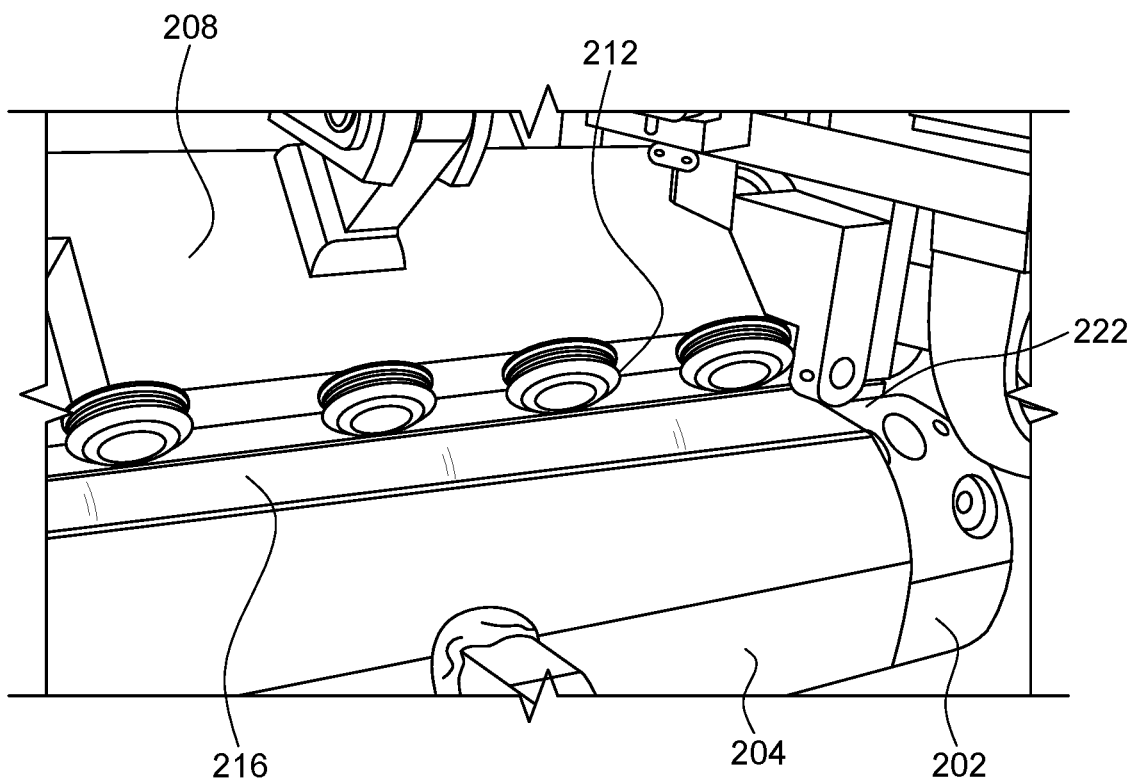

FIG. 30, FIG. 31, and FIG. 34 show the transport wheels 212 lowered, such as via the wheel unit 208, to contact the sheet 110 as bent into the tube 216 and transport the sheet 110, as bent into the tube 216, into a container. Note that the transport wheels 212 can be used to hold the longitudinal opposing edge portions 122, 124 together before knurling, such as via pre-locking or others.

Figure 32:
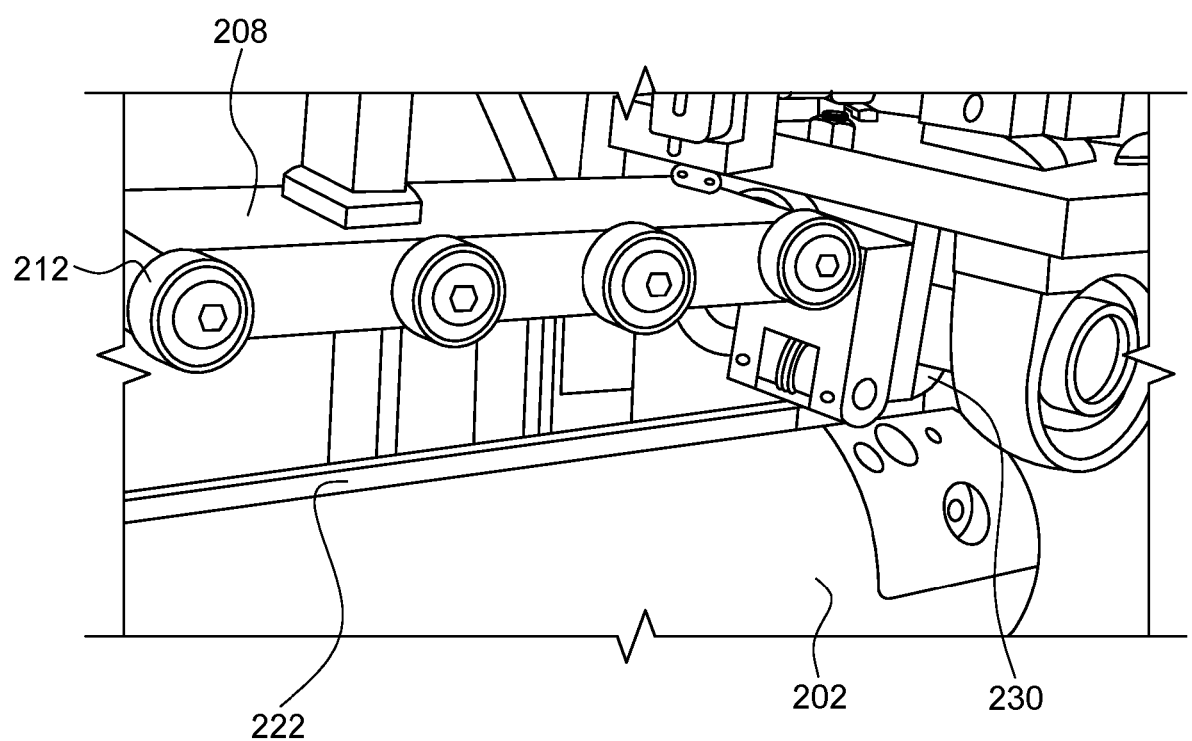

FIG. 32 shows the transport wheels 212 raised above the mandrel 202, such as via the wheel unit 208, as the pair of C-shaped jaws/clamp arms 204 are in the non-clamping position.

Figure 33:
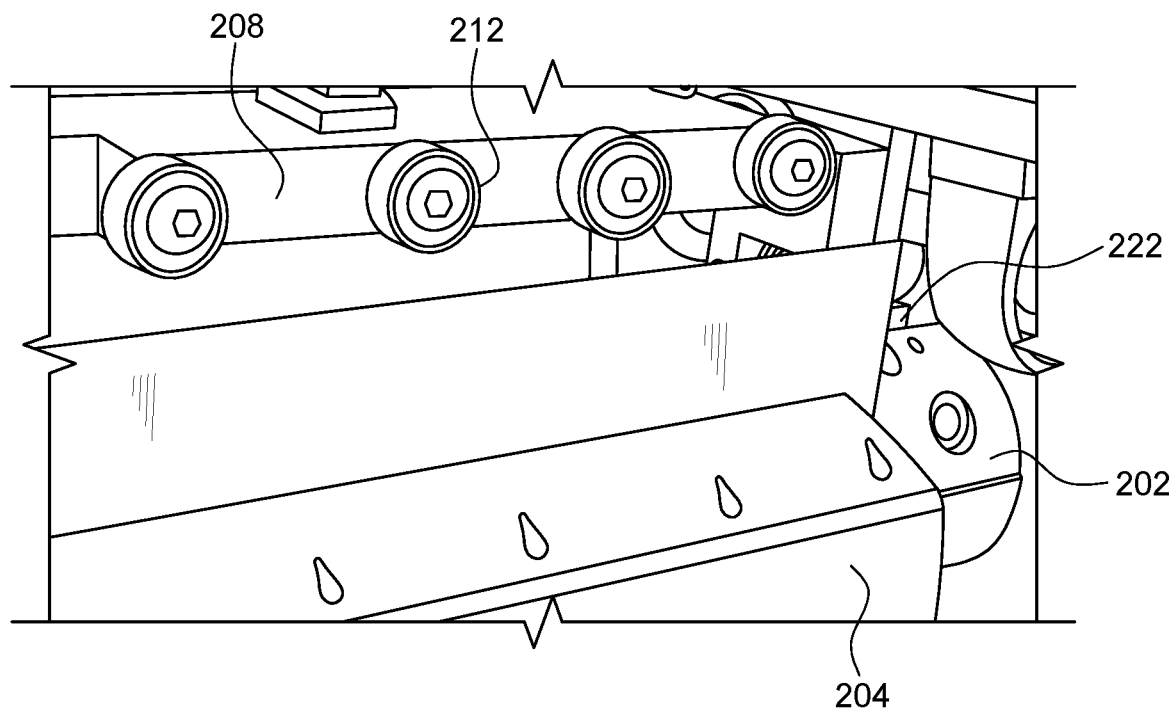

FIG. 33 shows the pair of C-shaped jaws/clamp arms 204 pivoting to the clamping position as the transport wheels 212 are raised above the mandrel 202, such as via the wheel unit 208.

Figure 35:
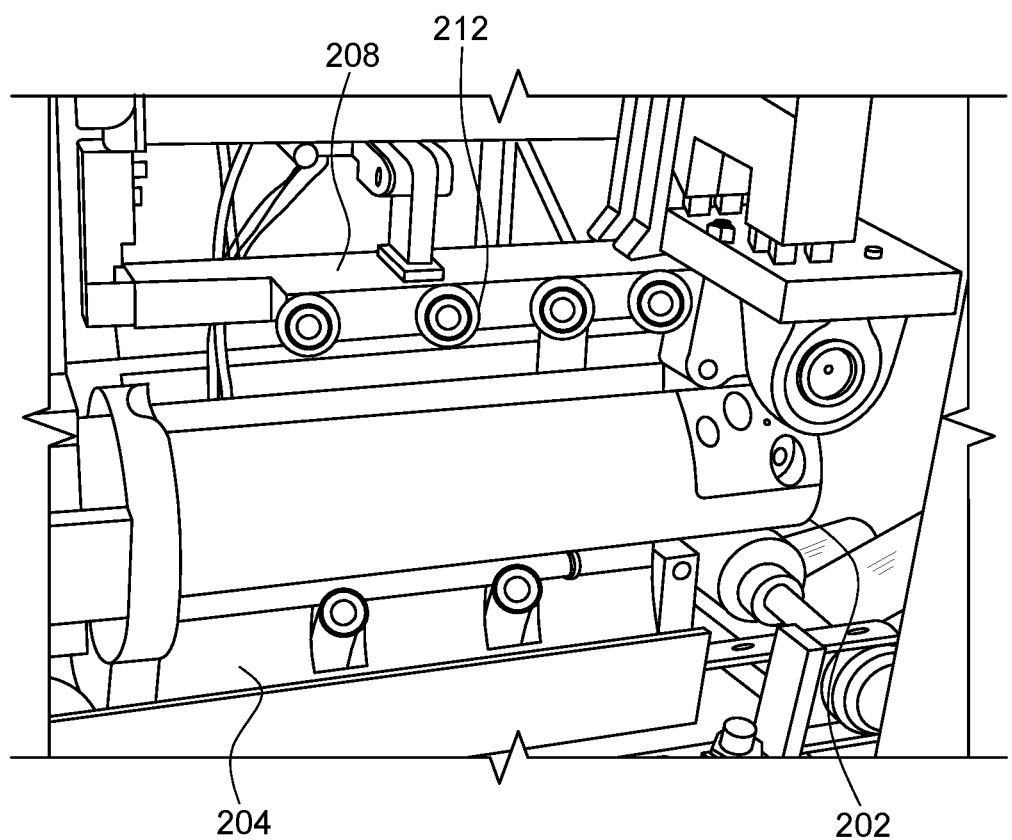

FIG. 35 shows a back view of the mandrel 202, where the transport wheels 212 are raised above the mandrel 202, such as via the wheel unit 208, and the pair of C-shaped jaws/clamp arms 204 are in the non-clamping position and the sheet 110 is not positioned between the fourth conveyor 206 and the mandrel 202.

Figure 36:
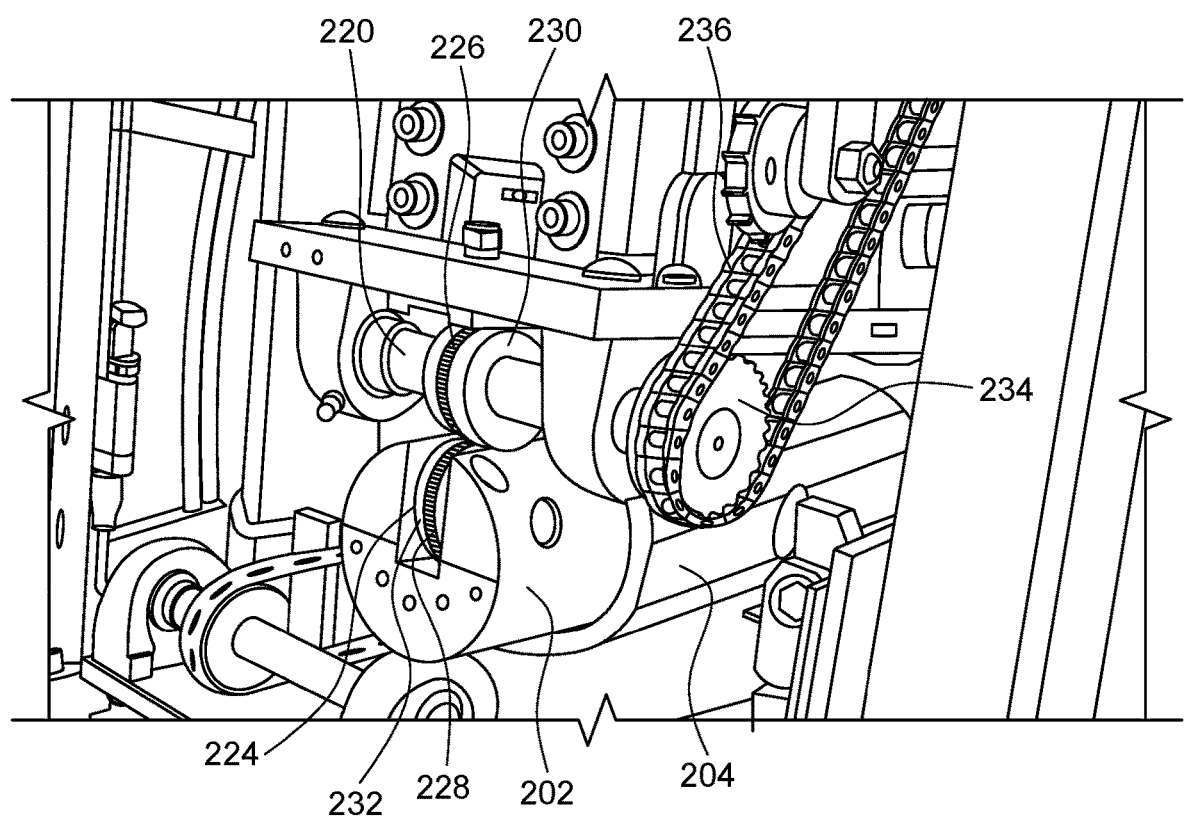
Figure 37:
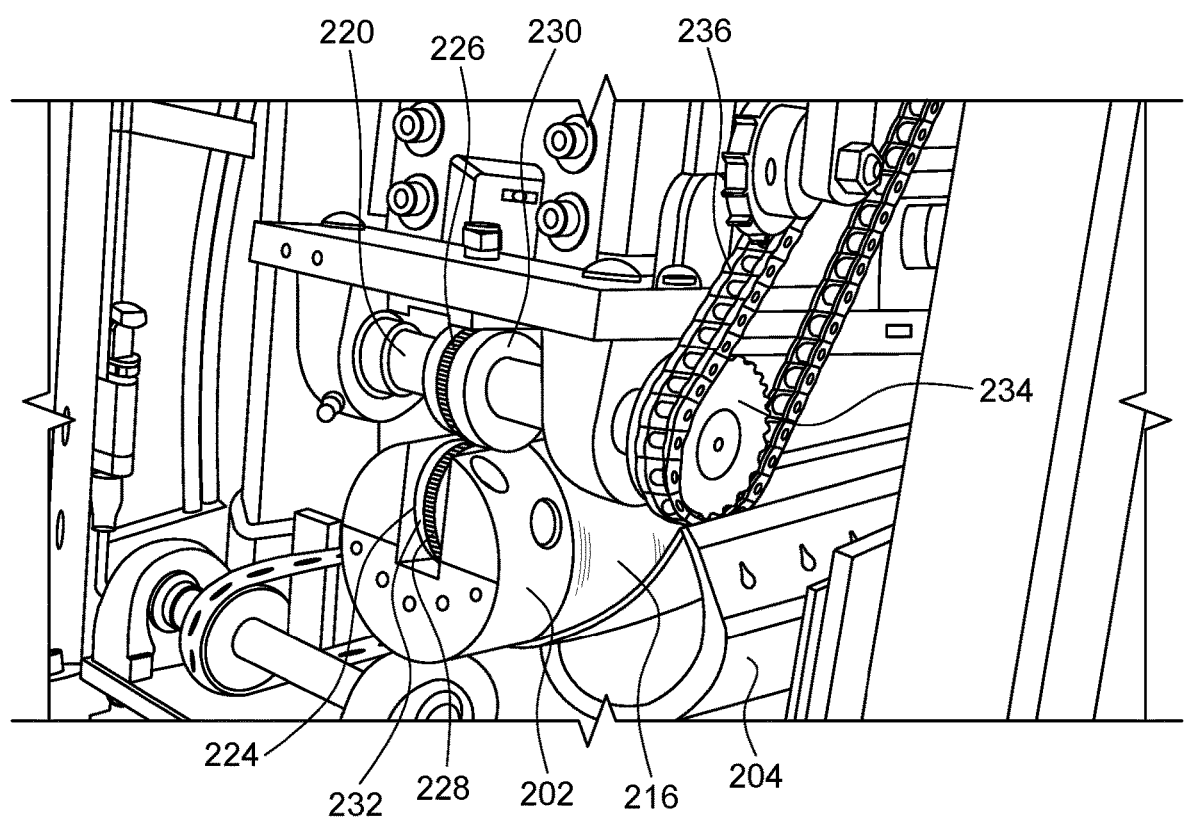

FIG. 36 and FIG. 37 shows a frontal perspective view of the mandrel 202, where the first knurling wheel unit 220 is positioned above the mandrel 202 and the second knurling wheel unit 224 is hosted in the mandrel 202. The first knurling wheel 230 of the first knurling wheel unit 220 may mesh with the second knurling wheel 232 of the second knurling wheel unit 224 in order to subsequently impart the first knurling pattern 226 externally to the sheet 110 as bent into the tube 216 and the second knurling pattern 228 internally to the sheet 110 as bent into the tube 216. The first knurling wheel unit 220 is driven via a gear wheel 234 and a chain 236 engaging the gear wheel 234, where the chain 236 can be driven via an electric motor, an internal combustion engine, or another drive source, whether powered via an electrical current, a fossil fuel, a renewable energy source, or others. However, note that such configuration may be reversed where the second knurling wheel unit 224 is driven via the gear wheel 234 and the chain 236 engaging the gear wheel 234. In some embodiments, the first knurling wheel unit 220 and the second knurling wheel unit 224 are driven via a common chain. Note that the pair of C-shaped jaws/clamp arms 204 are pivoting away from the clamping position.

Figure 38:
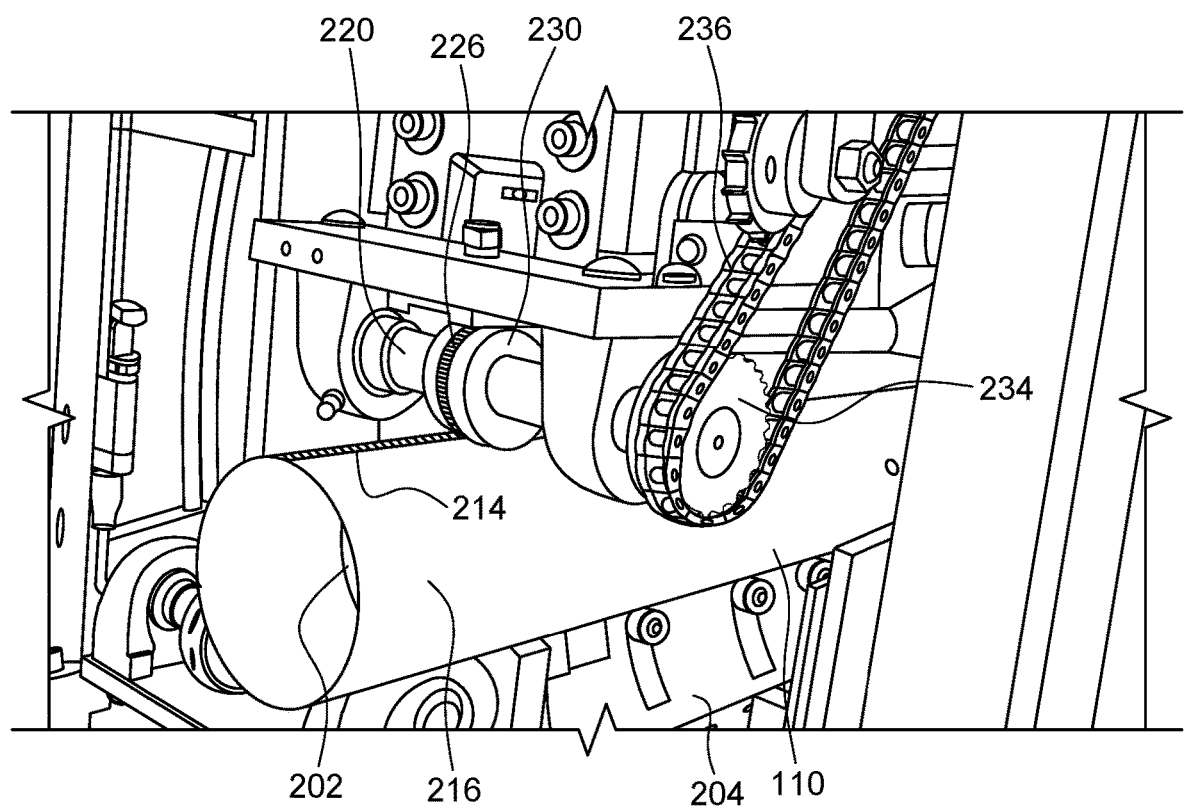
Figure 39:
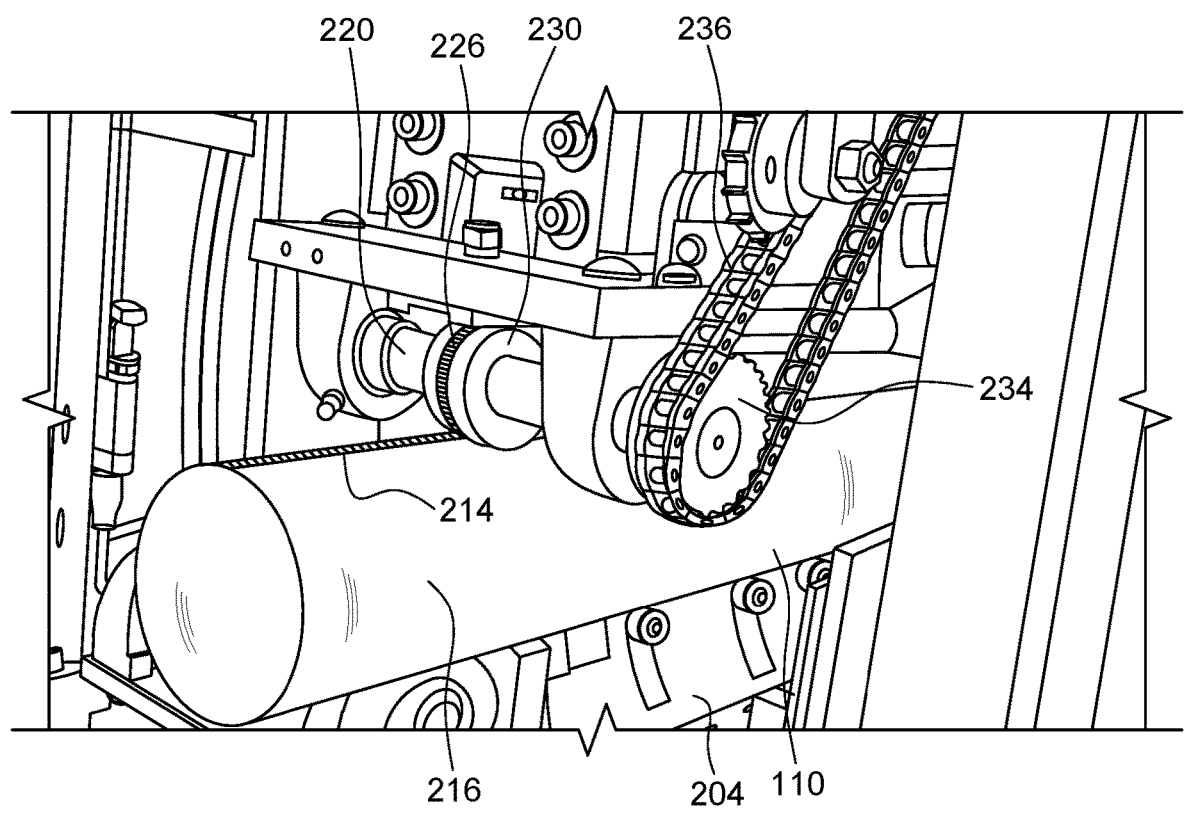

FIG. 38 and FIG. 39 shows the sheet 110 as bent into the tube 216 being transported by the transport wheels 212 as the first knurling wheel unit 220 knurls the sheet 110 in tubular shape, as manifested via the tube 216, as the pair of opposing longitudinal end portions 122, 124 are locking/engaging each other, while having the first knurling pattern 226 imparted thereon externally and the second knurling pattern 228 imparted thereon internally.

Figure 40:
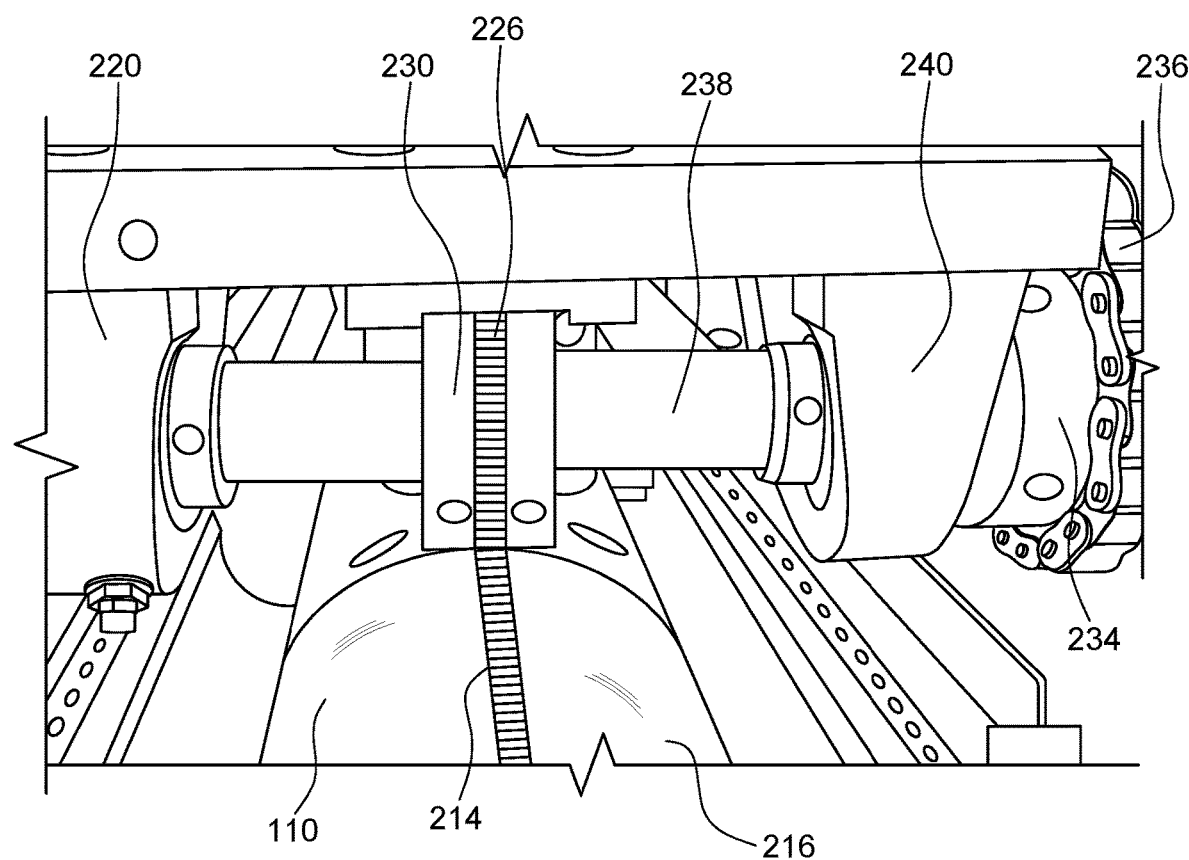

FIG. 40 shows the first knurling wheel 230 of the first knurling wheel unit 220 imparting the first knurling pattern 226 on the sheet 110, as bent into the tube 216, externally over the pair of opposing longitudinal end portions 122, 124 locking/engaging each other. Note that the first knurling wheel 230 is mounted on a rigid and rectilinear shaft 238 extending perpendicular to the mandrel 202, although non-rectilinear shaft 238, such as an arcuate shaft 238 or others, or diagonal orientation is possible, with corresponding wheel orientation and knurling pattern adjustment. The rigid shaft 238, which may comprise metal, plastic, wood, rubber, stone, alloys, or others, is mechanically coupled, such as via a bracket 240 adjacent to the gear wheel 234, to the gear wheel 234 engaging the chain 236 such that the shaft 238 rotates with the first knurling wheel 230 to impart the first knurling pattern 226. Note that although the first knurling wheel 230 is driven via the shaft 238, the first knurling wheel 230 can freely rotate about the shaft 238 and the second knurling wheel 232 is driven, whether additionally or alternatively.

Figure 41:
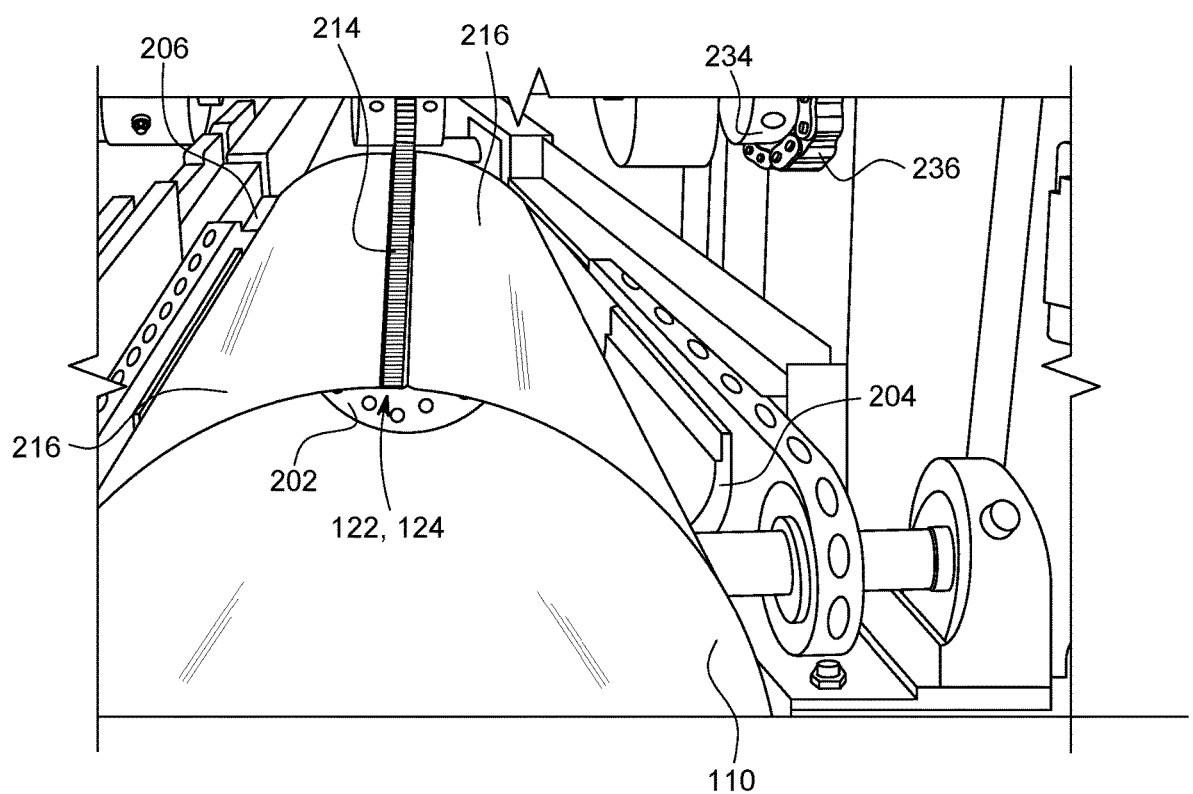

FIG. 41 shows the sheet 110 bent tubularly, into the tube 216, with the first knurling pattern 226 imparted thereon over the pair of opposing longitudinal end portions 122, 124 locking/engaging each other, being transported into a container.

Figure 42:
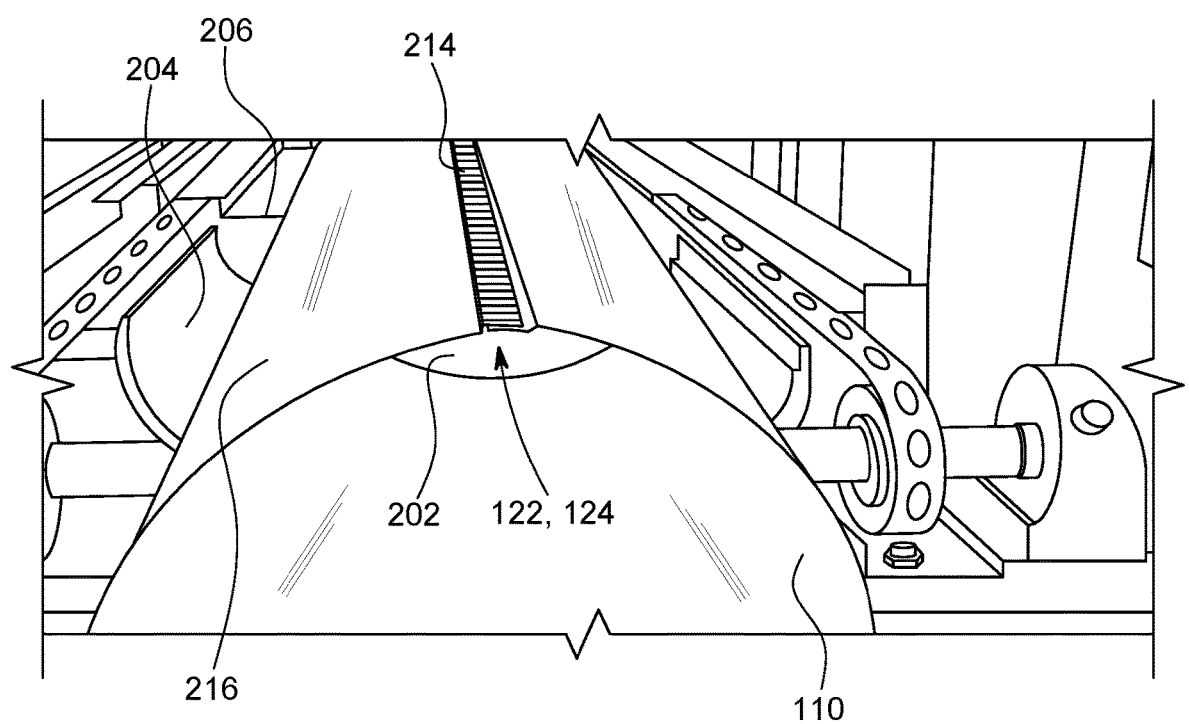
Figure 43:
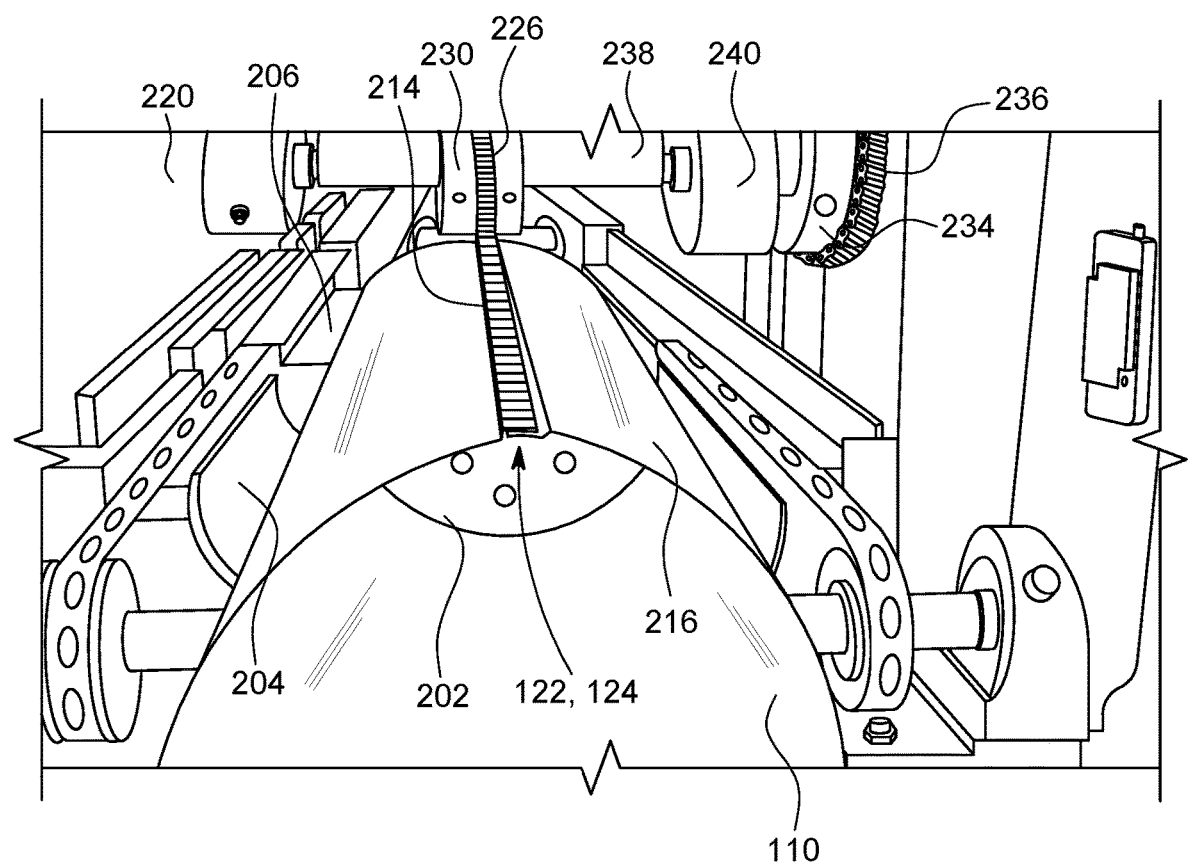
Figure 44:
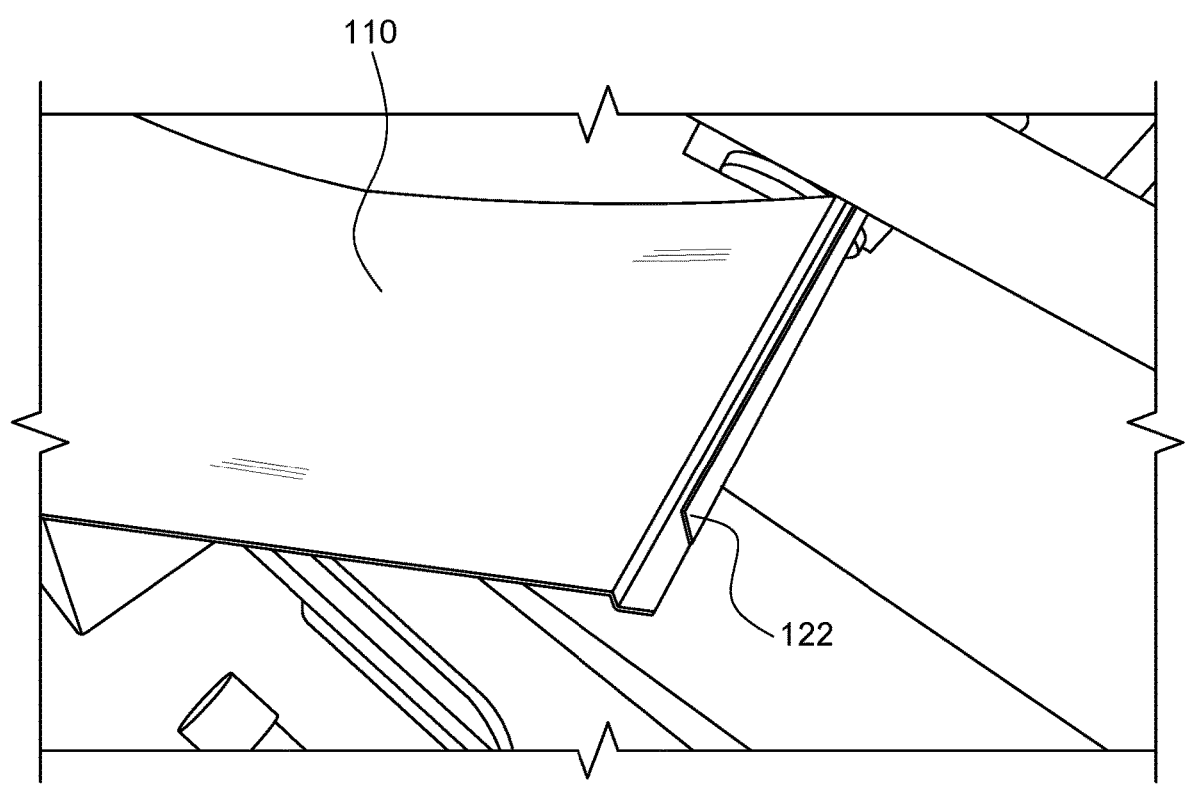
Figure 45:
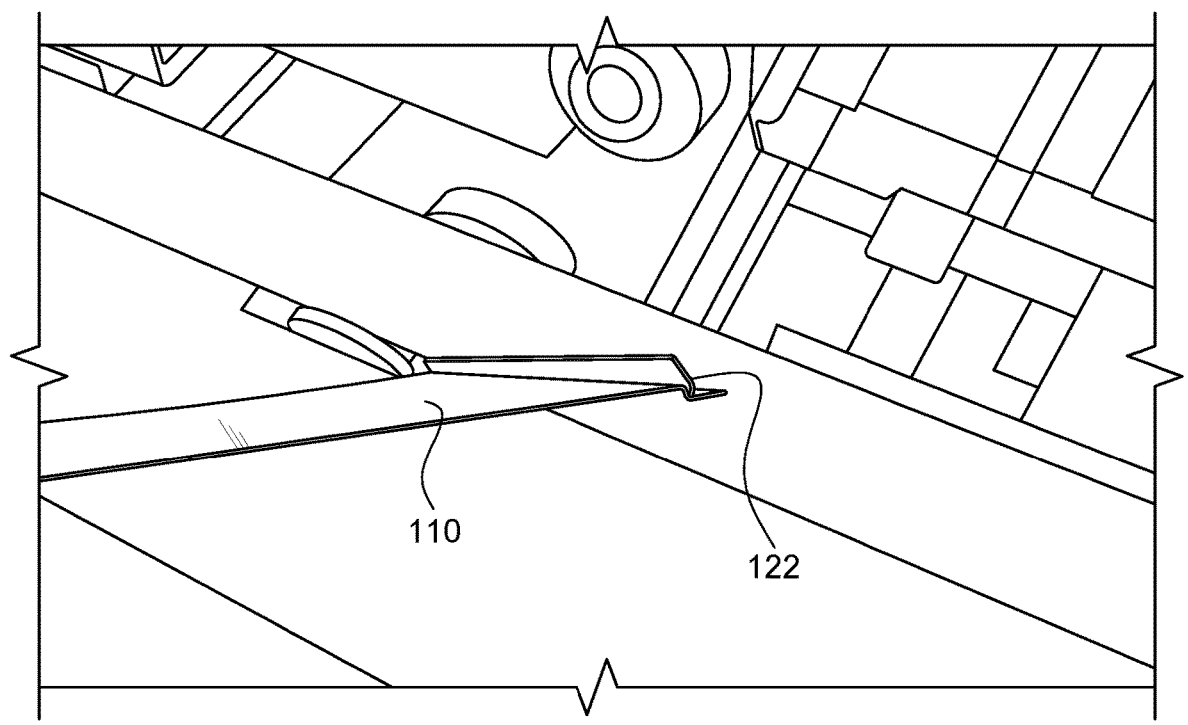
Figure 46:
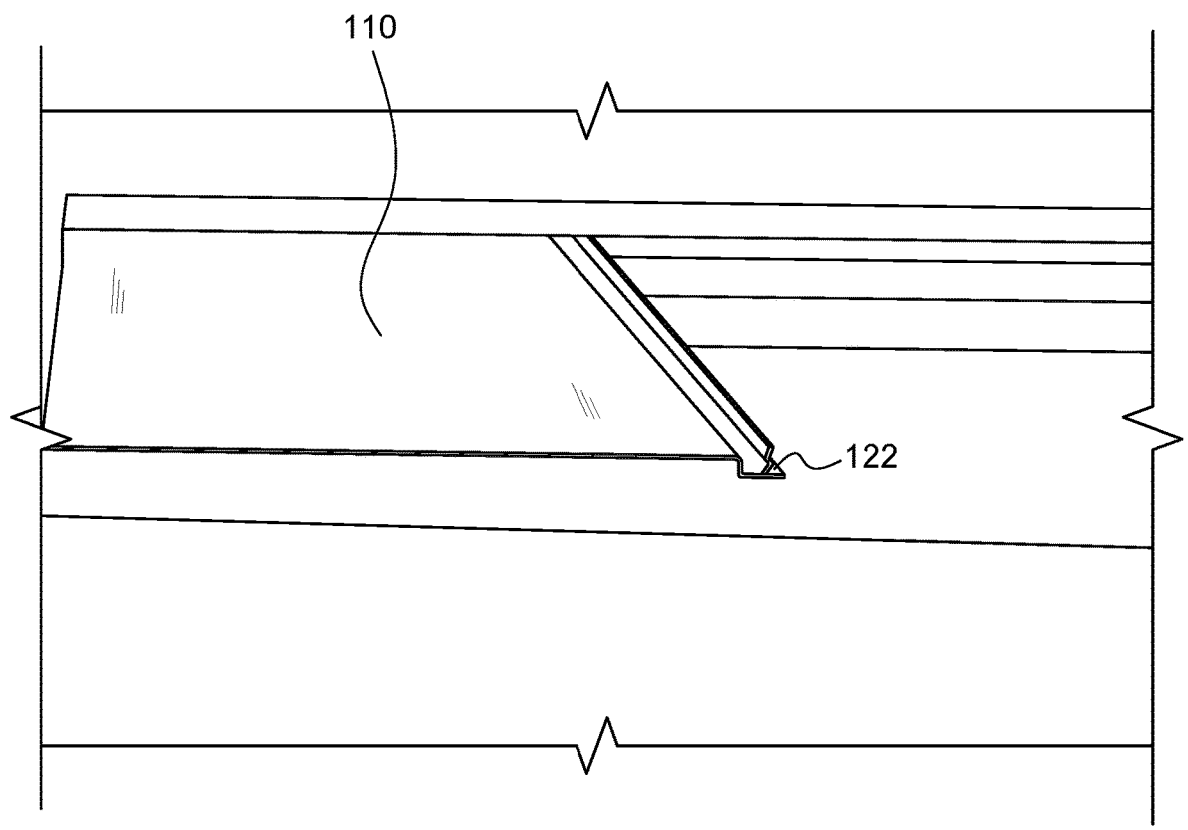
Figure 47:
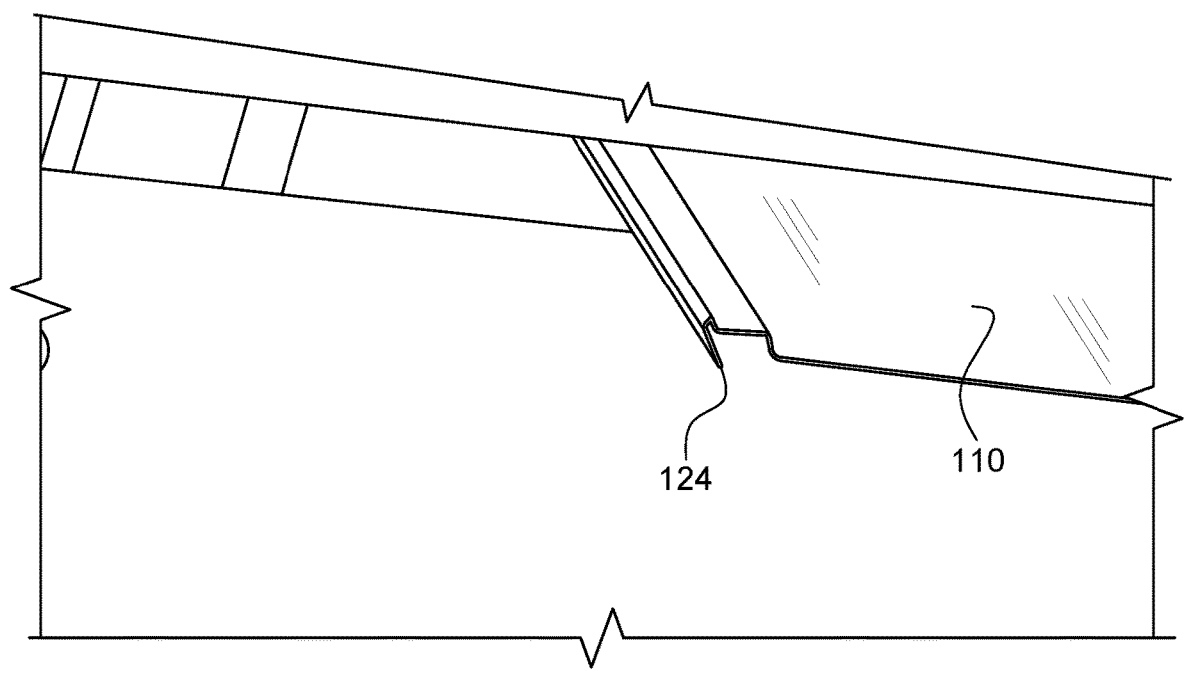

FIG. 42 and FIG. 43 shows the first knurling pattern 226 on the sheet 110, as bent into the tube 216, over the pair of opposing longitudinal end portions 122, 124 locking/engaging each other.

FIG. 44, FIG. 45, FIG. 46, and FIG. 47 show longitudinal end portions 122, 124 of the sheet 110 bent into a locking configuration, such as shown in FIG. 48.

FIG. 49-FIG. 55 show schematics and tubing formed in accordance with this disclosure. In particular, when actively tube forming, the mandrel 202 is at least partially enclosed via the tube 216 formed via bending about the mandrel 202, as disclosed herein. The transport wheels 212 are lowered via the wheel unit 208 such that the transport wheels 212 contact, such as via rolling or others, the tube 216, as disclosed herein. The wheel unit 208 is automatically raised, such as via upward pivoting or others, and automatically lowered, such as via downward pivoting or others, via an assembly 246, which operably employs actuators, levers, pistons, hinges, pneumatics, and other mechanical force applicators, to deploy and un-deploy the wheel unit 208, as disclosed herein.

Figure 51:
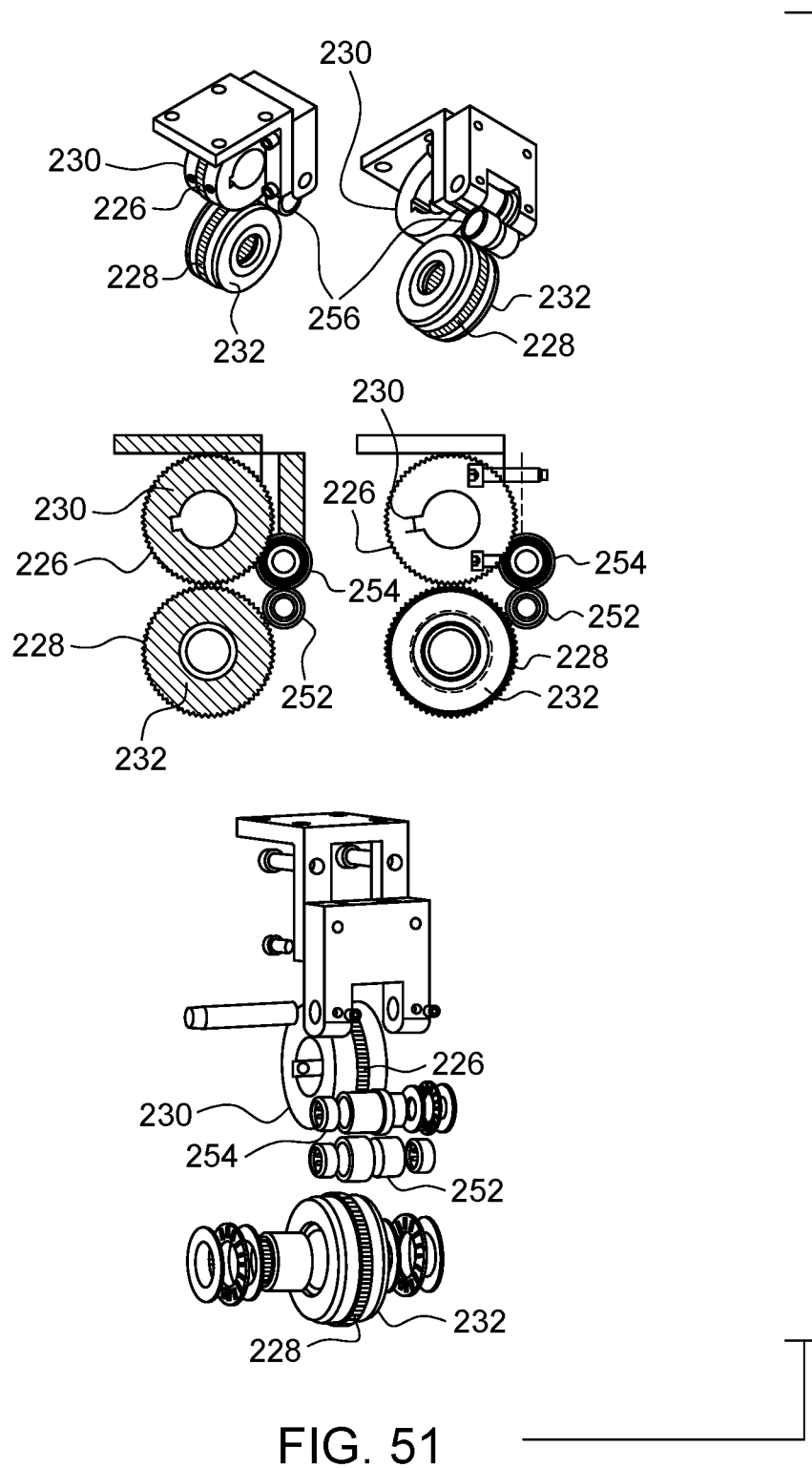

The pair of C-shaped jaws/clamp arms 204 host an elongated, rigid, fixedly positioned, and rectilinear shaft 250 in a plurality of hinges 258. The pair of C-shaped jaws/clamp arms 204 pivots about the shaft 250 from the non-clamping position (lowered) to the clamping position (raised) and back. The shaft 250 longitudinally extends below the mandrel 202 such that the mandrel 202 is positioned between the shaft 250 and the wheel unit 208. Although each of the pair of C-shaped jaws/clamp arms 204 includes two hinges 258, this can configuration vary, such as at least one hinge 258 per C-shaped jaws/clamp arm 204 or three or more hinges 258 per C-shaped jaws/clamp arm 204, as context suitable. Additionally, note that the pair of C-shaped jaws/clamp arms 204 supports a pair of plates fastened thereto via a plurality of fasteners 260, such as screws, bolts, or others, distal to the hinges 258. Note that other ways of securing the plates can be used, such as via magnetizing, mating, nailing, adhering, interlocking, brazing, welding, or others. Also, note that the plates can be continuously unitary to the pair of C-shaped jaws/clamp arms 204 such that the plates include same material as the pair of C-shaped jaws/clamp arms 204. Further, the pair of C-shaped jaws/clamp arms 204 internally host a pair of elongated, rigid, fixedly positioned, and rectilinear shafts 248 that are pivotally and respectfully coupled to a pair of corresponding cylinders 242. The cylinders 248 respectively include a pair of vertically movable pistons respectively corresponding to the pair of C-shaped jaws/clamp arms 204. As the pistons move, in-sync, along a vertical plane, such as up and down, based on a pair of forces respectfully applied to the pistons, such as via an electric motor, an internal combustion engine, an actuator, a cam action, a cylindrically internal combustion, or others, the pistons respectively apply a pair of forces, whether push or pull, to the pair of C-shaped jaws/clamp arms 204 such that the pair of C-shaped jaws/clamp arms 204 pivots about the shaft 250 and about the shafts 248 from the non-clamping position (lowered) to the clamping position (raised) and back. Note that the shaft 250 or the shafts 248 can be arcuate as well, but then orientation and structuring should be adjusted accordingly. Moreover, note that a pair of preform wheels 252, 254 may be positioned such that the tube 216 can be moved therebetween, where none, some, most, or all of the wheels 252 can be idler wheels or driver wheels in any combination, whether on one or both sides of the tube forming machine 200. Note that the pair of preform wheels 252, 254 can be used to pre-guide the longitudinal opposing edge portions 122, 124 for final closing, such as via locking or others, and knurling, as disclosed herein. As shown in FIG. 51, the preform wheels 252, 254 are included in a wheel assembly 256 that also includes the first knurling wheel 230 and the second knurling wheel 232. As such, the preform wheels 252, 254 may aid the first knurling wheel 230 and the second knurling wheel 232 in operation.

Figure 49:
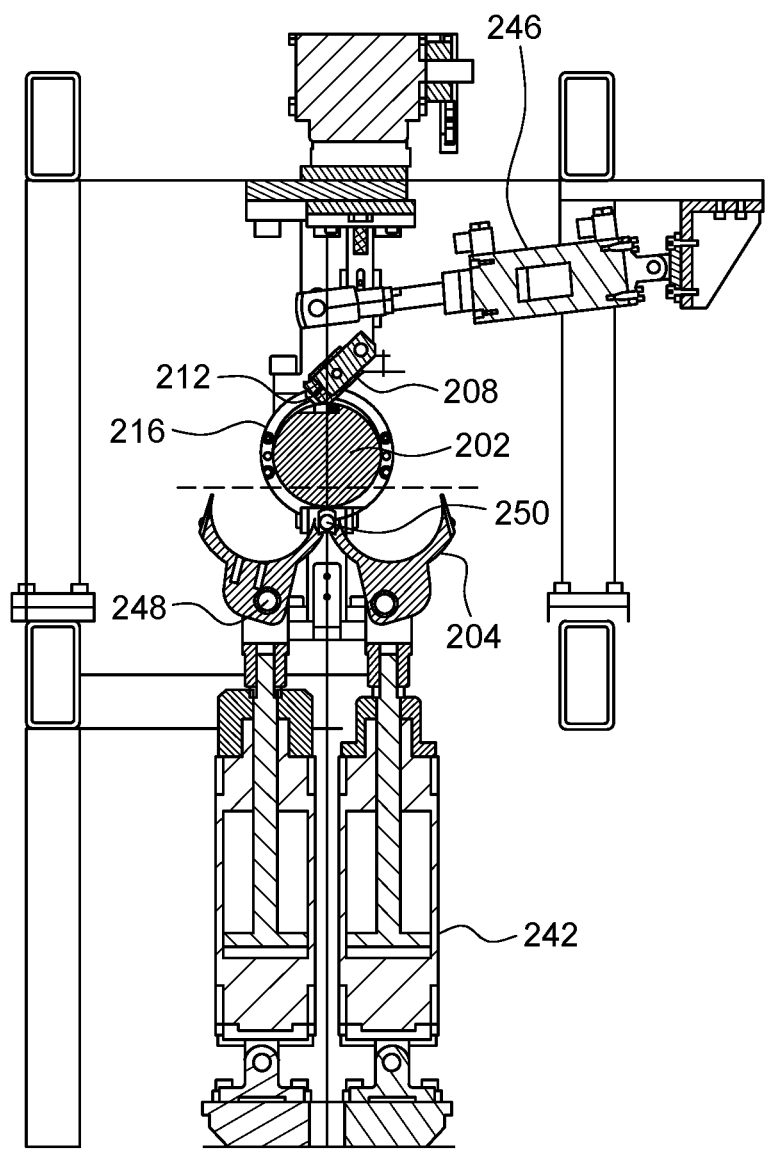
FIG. 49-FIG. 55 show schematics and tubing formed in accordance with this disclosure.
Figure 50:
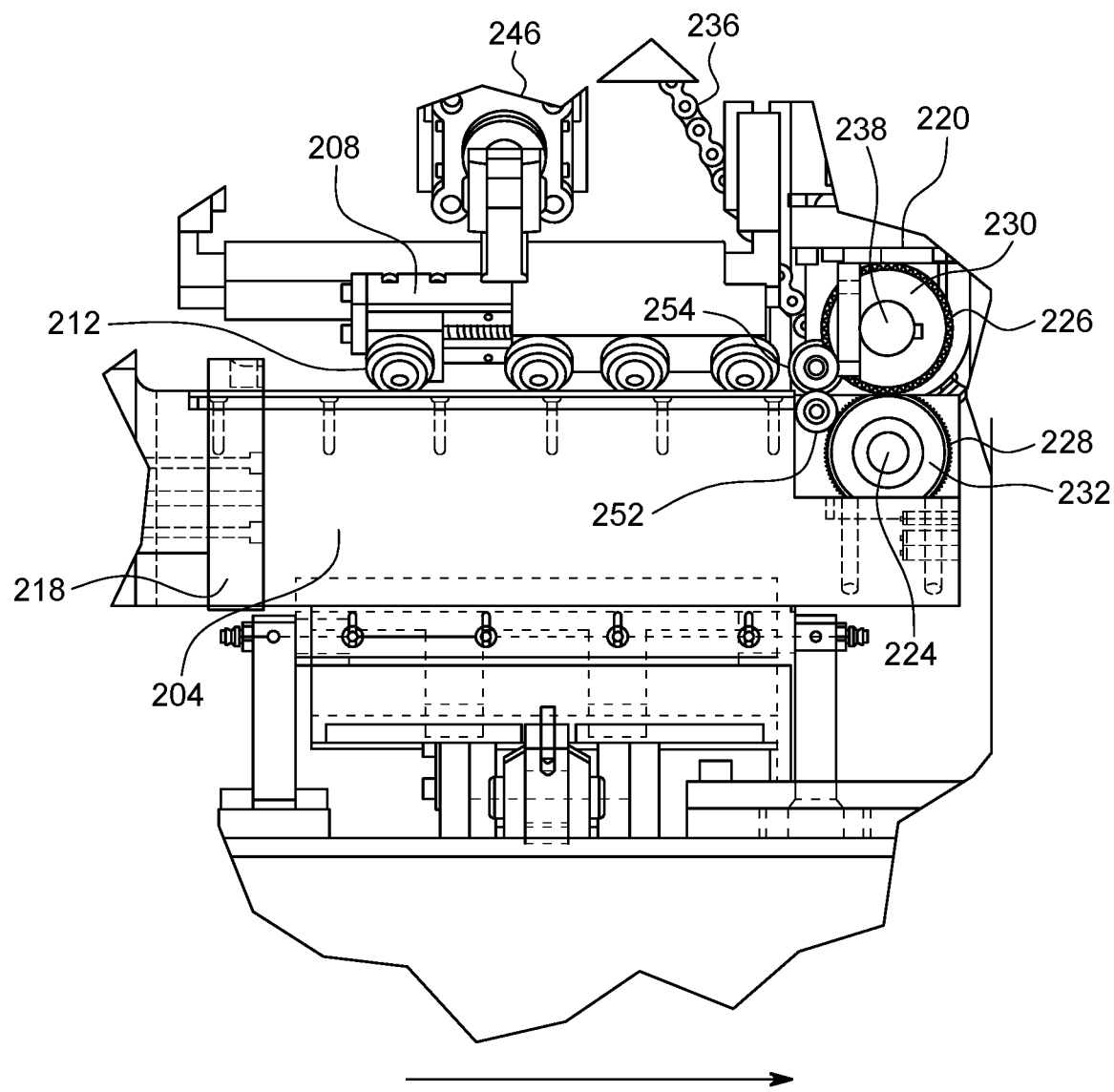
Figure 52:
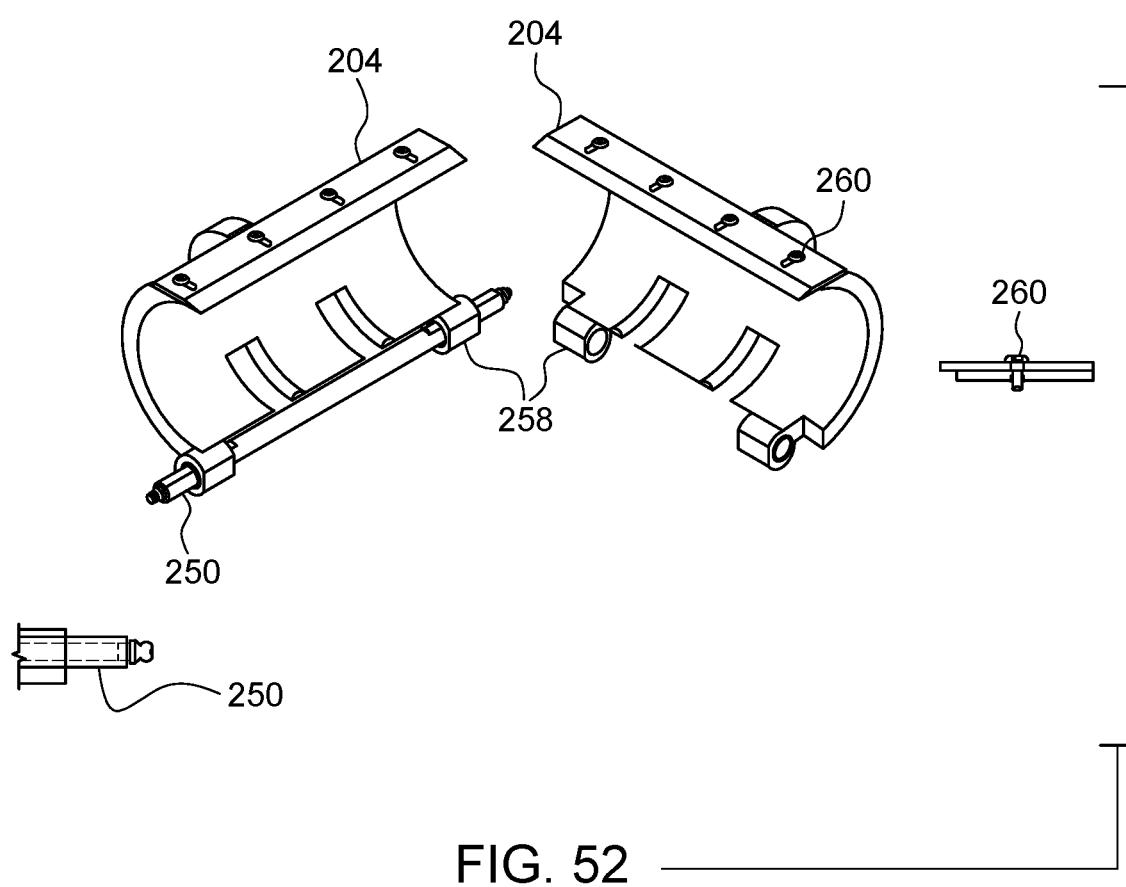
Figure 54:
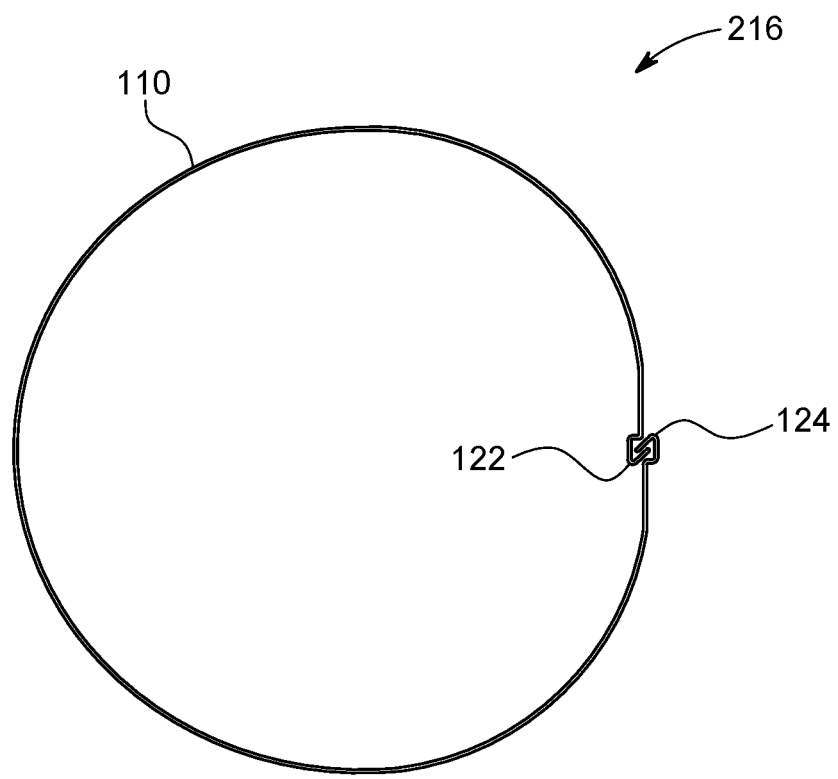

As shown in FIG. 54, the sheet 110, as bent into the tube 216, comprises the pair of longitudinal opposing edge portions 122, 124. Each of the longitudinal opposing edge portions 122, 124 comprises a locking configuration formed longitudinally. Once the locking configurations are formed, such as via the lock forming machine or the roll forming machine, such as those manufactured via Lockformer® company or others, or the press brake 118 or others, while the sheet 110 is not yet bent into a tubular form of the tube 216, such as when the sheet 110 is flat/planar, the sheet 110 is sent into the tube forming machine 200, such as a closing station, as shown in FIG. 50. The sheet 110 with the locking configurations is bent around the mandrel 202, as shown in FIG. 49, with the pair of C-shaped jaws/clamp arms 204, as shown in FIG. 49 and FIG. 52. Such processing shapes the sheet 110 to have a circular cross-section 216 and interlocks the locking configurations, as shown in FIG. 54. Note that the tube forming machine 200 can be configured for allowing the tube 216 to have cross-sections that are shaped differently, such as triangular, rectangular, square, pentagonal, hexagonal, or others. In such configurations, the mandrel 202 and the pair of C-shaped jaws/clamp arms 204 are correspondingly structured in accordance with a desired shape. For example, in order for the tube 216 to have a triangular cross-section, the mandrel 202 can be triangularly shaped, yet still provide for the cavity 222 internally hosting the second knurling wheel 232, and the pair of C-shaped jaws/clamp arms 204 can be V-shaped or L-shaped as desired. Other, cross-sectional shapes of the tube 216 can accomplished similarly.

Figure 53:
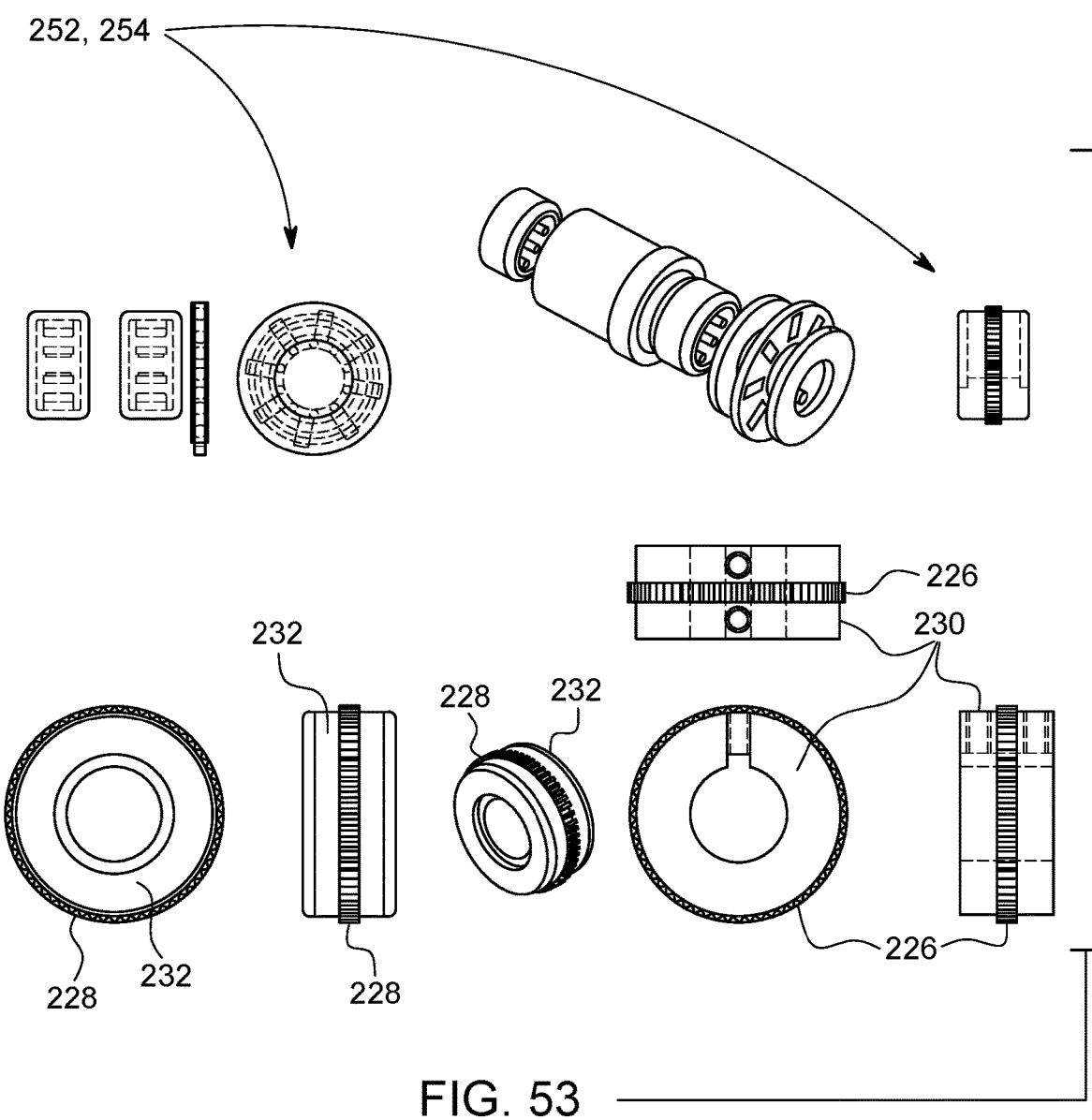

Once the locking configurations interlock with each other, such as shown in FIG. 54, the sheet 110 is pushed between the first knurling wheel 230 of the first knurling wheel unit 220 and the second knurling wheel 232 of the second knurling unit 224, as shown in FIG. 50, FIG. 51, and FIG. 53, such that the locking configurations begin to pass between the first knurling wheel 230 and the second knurling wheel 232, which begin to flatten the locking configurations together. The sheet 110, as tubularly formed into the tube 216, continues to pass through between the first knurling wheel 230 and the second knurling wheel 232, which eventually flattens the locking configurations substantially and thereby embeds a knurling profile into the sheet 110, as bent into the tube 216. Note that this knurling profile including the first knurling pattern 226 external to the tube 216 and the second knurling pattern 228 internal to the tube 216. Therefore, the knurling profile locks the locking configurations together and creates a stiffening seam along the seam 214 of the sheet 110, as tubularly formed into the tube 216.

Figure 55:
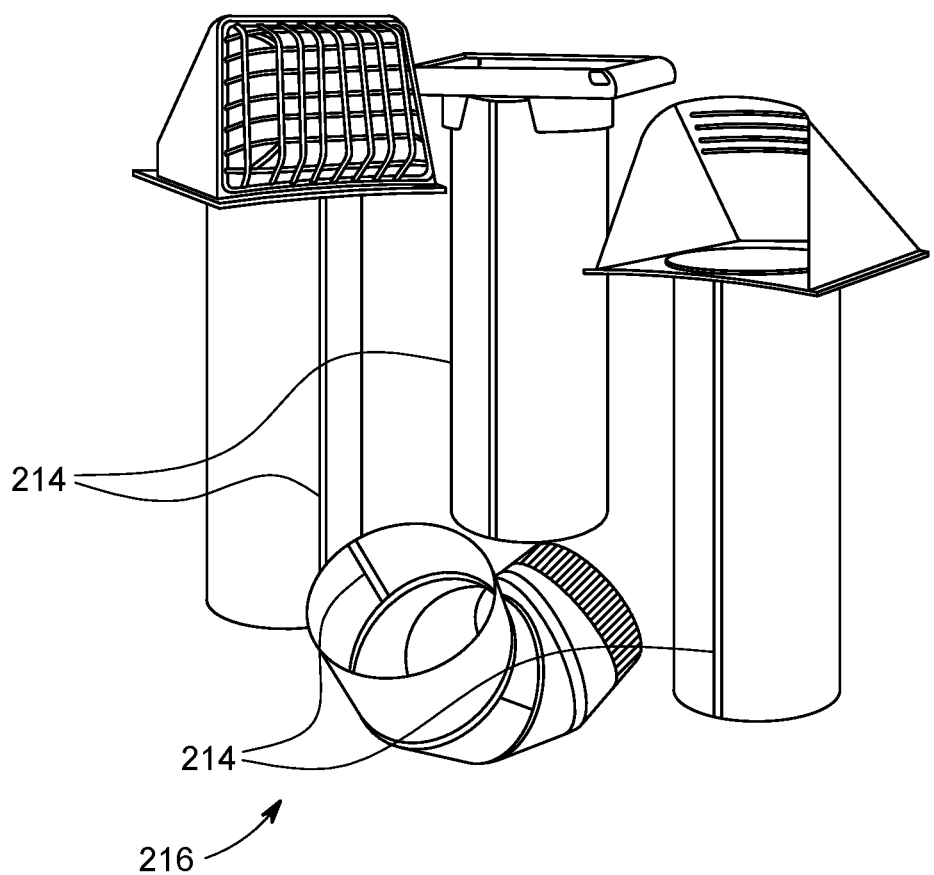

FIG. 55 shows various tubular structures that can be manufactured with the knurling profile. Note that the tubular structures include the tube 216, as embodied for different contexts, whether rectilinear, arcuate, sinusoidal, or others.

Note that the tube 216, as described herein, can be used for various purposes, such as for conduction of a fluid, including a liquid or a gas. For example, the liquid may comprise water, crude oil, diesel fuel, heating oil, kerosene, gasoline, beverages, sewage, slurry, ammonia, vehicle exhaust, condensation, or others, whether forced or gravitationally induced. For example, the gas may comprise air, steam, hydrogen, natural gas, exhaust gas, or others, including forced.

Note that the tube 216, as describe herein, can be used for wire/cable routing. For example, such routing may entail metal wiring, such as copper, or fiber optics. For example, such routing may entail network cable routing.

Note that the tube 216, as described herein, can be used for car bodies, engine components, mufflers, airplane wings, medical tables, roofs for buildings, transformers, electric machines, pumps, valves, chemical equipment, marine applications, cutlery, appliances, chemical processing equipment, light reflectors, jewelry, stampings, spun and drawn parts, air tubing, mail boxes, cabinets, tanks, fan blades, electronic chassis, pressure vessels, aircraft structures, HVAC ducts, dryer vents, needle lumens, or others.

In some embodiments, various functions or acts can take place at a given location and/or in connection with the operation of one or more apparatuses or systems. In some embodiments, a portion of a given function or act can be performed at a first device or location, and a remainder of the function or act can be performed at one or more additional devices or locations.

Various corresponding structures, materials, acts, and equivalents of all means or step plus function elements in various claims below are intended to include any structure, material, or act for performing the function in combination with other claimed elements as specifically claimed. Various embodiments were chosen and described in order to best explain various principles of this disclosure and various practical applications thereof, and to enable others of ordinary skill in a pertinent art to understand this disclosure for various embodiments with various modifications as are suited to a particular use contemplated.

Various diagrams depicted herein are illustrative. There can be many variations to such diagrams or steps (or operations) described therein without departing from various spirits of this disclosure. For instance, various steps can be performed in a differing order or steps can be added, deleted or modified. All of these variations are considered a part of this disclosure. People skilled in an art to which this disclosure relates, both now and in future, can make various improvements and enhancements which fall within various scopes of various claims which follow.

This detailed description has been presented for various purposes of illustration and description, but is not intended to be fully exhaustive and/or limited to this disclosure in various forms disclosed. Many modifications and variations in techniques and structures will be apparent to those of ordinary skill in an art without departing from a scope and spirit of this disclosure as set forth in various claims that follow. Accordingly, such modifications and variations are contemplated as being a part of this disclosure. A scope of this disclosure is defined by various claims, which include known equivalents and unforeseeable equivalents at a time of filing of this disclosure.

What is claimed is:

1. A method comprising:
   bending a sheet about a mandrel such that the sheet is tubular, wherein the sheet includes a first longitudinal end portion and a second longitudinal end portion;
   interlocking the first longitudinal end portion with the second longitudinal end portion over the mandrel;
   passing the sheet between a plurality of knurling wheels such that the sheet is knurled, wherein the mandrel hosts one of the knurling wheels; and
   pushing the sheet along the mandrel to the knurling wheels via a base portion, wherein the base portion moves along the mandrel.

2. The method of claim 1, wherein the sheet defines a cavity when the sheet is tubular, wherein the sheet is knurled such that the first longitudinal end portion and the second longitudinal end portion do not disengage to enable a leak of a fluid from the cavity as the fluid flows within the cavity.

3. The method of claim 2, wherein the fluid is a liquid.

4. The method of claim 1, wherein the mandrel is C-shaped such that the mandrel defines a cavity containing the one of the knurling wheels.

5. The method of claim 1, wherein the one of the wheels is an idler wheel.

6. The method of claim 1, wherein the one of the wheels is a driver wheel.

7. The method of claim 1, wherein the bending is via a pair of arcuate portions, wherein at least one of the arcuate portions extends over the one of the knurling wheels during the bending.

8. The method of claim 7, wherein the pair of arcuate portions pivot about a shaft common thereto.

9. The method of claim 1, wherein the mandrel includes a U-shaped cavity containing the one of the knurling wheels.

10. The method of claim 1, wherein the base portion moves between a first position and a second position, wherein the base portion is more distal to the knurling wheels in the first position than the base portion to the knurling wheels in the second position.

11. The method of claim 1, wherein the pushing is via the base portion plunging along the mandrel longitudinally.

12. The method of claim 1, wherein the pushing for a limited time period.

13. The method of claim 1, wherein the pushing is for a limited distance along the mandrel.

14. The method of claim 1, further comprising:
   retracting the base portion to a default position responsive to the pushing.

15. The method of claim 1, further comprising:
   outputting the sheet as knurled into a container.

16. The method of claim 1, wherein the interlocking includes mating the first longitudinal end portion with the second longitudinal end portion over the mandrel.

17. The method of claim 16, wherein the first longitudinal end portion includes a male portion, wherein the second longitudinal end portion includes a female portion, wherein the female portion includes an S-bend configured to receive the male portion.

18. The method of claim 1, further comprising:
lowering a housing hosting a wheel such that the wheel contacts the sheet after the bending and before the passing.

\* \* \* \* \*